(12) United States Patent
Eggerding et al.

(10) Patent No.: US 7,724,496 B2
(45) Date of Patent: May 25, 2010

(54) MULTILAYER VERTICALLY INTEGRATED ARRAY TECHNOLOGY

(75) Inventors: Carl L. Eggerding, Murrells Inlet, SC (US); Ronald S. Demcko, Raleigh, NC (US); John L. Galvagni, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 665 days.

(21) Appl. No.: 11/590,681

(22) Filed: Oct. 31, 2006

(65) Prior Publication Data

US 2007/0103846 A1 May 10, 2007

Related U.S. Application Data

(60) Provisional application No. 60/733,964, filed on Nov. 4, 2005.

(51) Int. Cl.
*H01G 4/005* (2006.01)
*H01G 4/228* (2006.01)

(52) U.S. Cl. .................................. 361/303; 361/306.1
(58) Field of Classification Search ................. 361/303, 361/305, 311–313, 321.1, 306.3, 309
See application file for complete search history.

(56) References Cited

U.S. PATENT DOCUMENTS

| | | | |
|---|---|---|---|
| 4,039,997 A | 8/1977 | Huang et al. | |
| 4,286,251 A | 8/1981 | Howell | |
| 4,831,494 A | 5/1989 | Arnold et al. | |
| 5,799,379 A | 9/1998 | Galvagni et al. | |
| 6,456,481 B1* | 9/2002 | Stevenson | 361/302 |
| 6,515,842 B1* | 2/2003 | Hayworth et al. | 361/303 |
| 6,757,152 B2 | 6/2004 | Galvagni et al. | |
| 7,016,175 B2 | 3/2006 | MacNeal et al. | |
| 2004/0042155 A1* | 3/2004 | Ritter et al. | 361/309 |

* cited by examiner

*Primary Examiner*—Eric Thomas
(74) *Attorney, Agent, or Firm*—Dority & Manning, P.A.

(57) ABSTRACT

The present subject matter is directed to methods and apparatus for providing a multilayer array component with interdigitated electrode layer portions configured to selectively provide signal filtering characteristics, over-voltage transient suppression capabilities, and land grid array (LGA) terminations. Embodiments of the present subject matter may define a single capacitor, a capacitor array, or a multilayer vertically integrated array with configurable equivalent electrical characteristics including equivalent series inductance (ESL), equivalent series resistance (ESR), and configurable capacitance and voltage clamping and transient suppression capabilities.

43 Claims, 11 Drawing Sheets

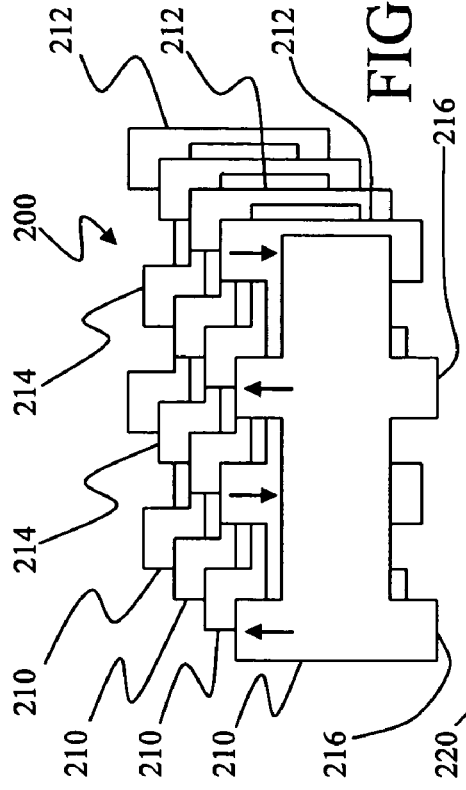
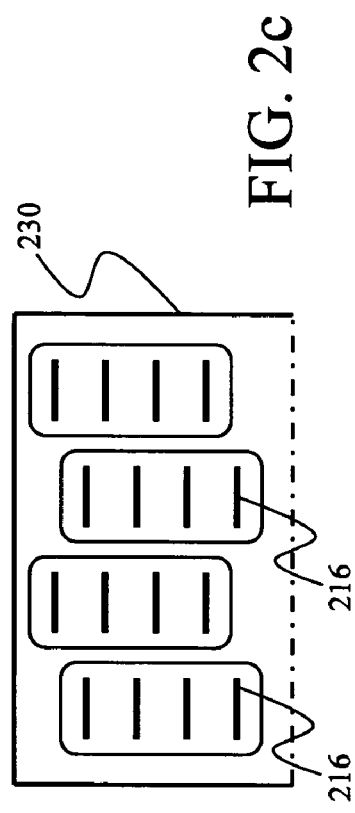
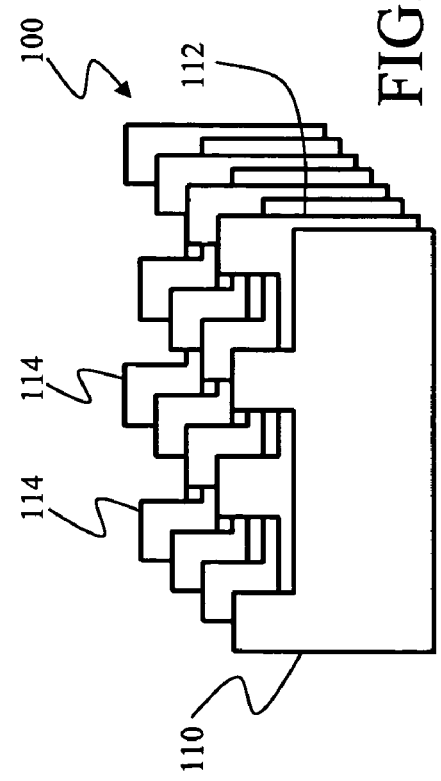
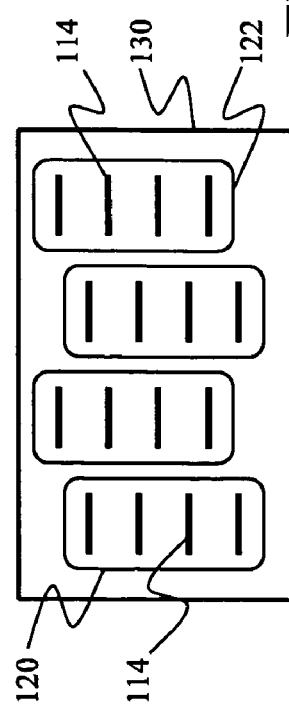
FIG. 1a
FIG. 1b
FIG. 1c
FIG. 2a
FIG. 2b
FIG. 2c

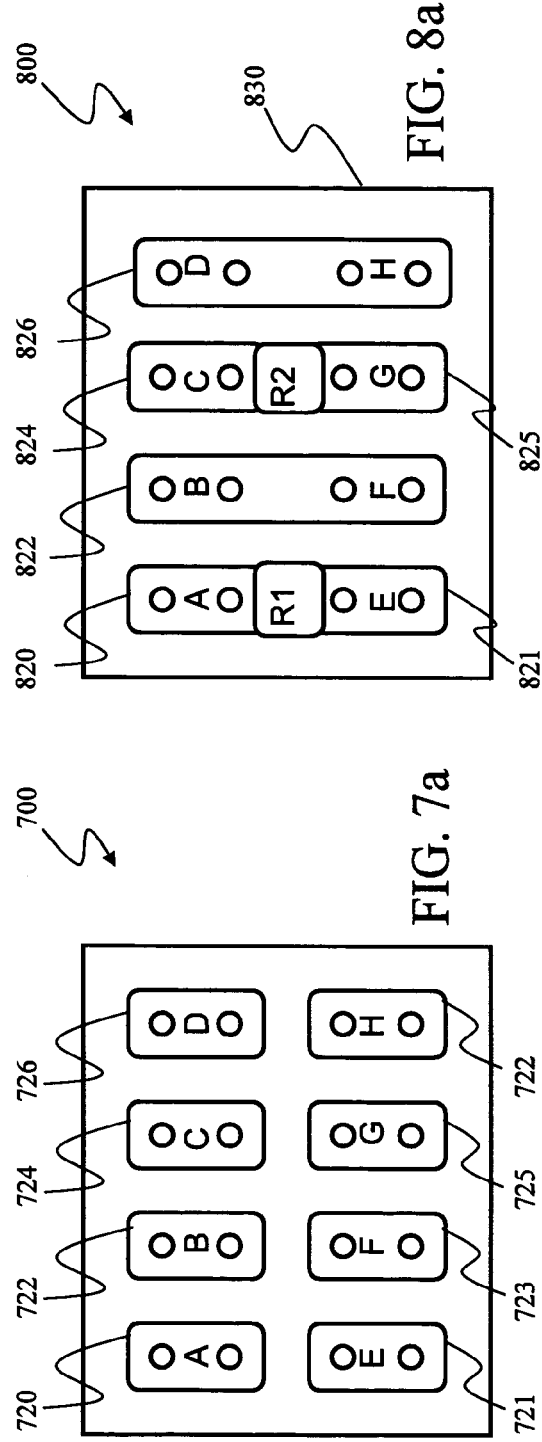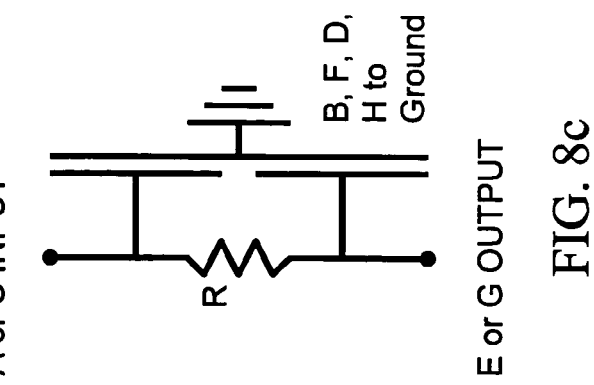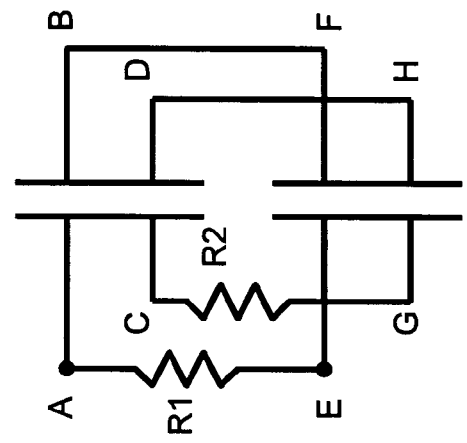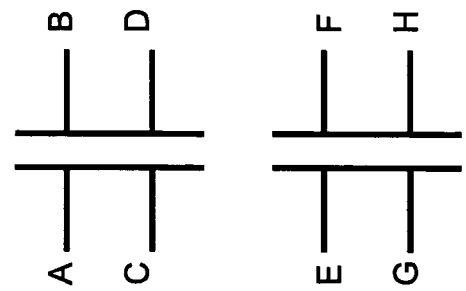
FIG. 8a
FIG. 8c
FIG. 8b
FIG. 7a
FIG. 7b

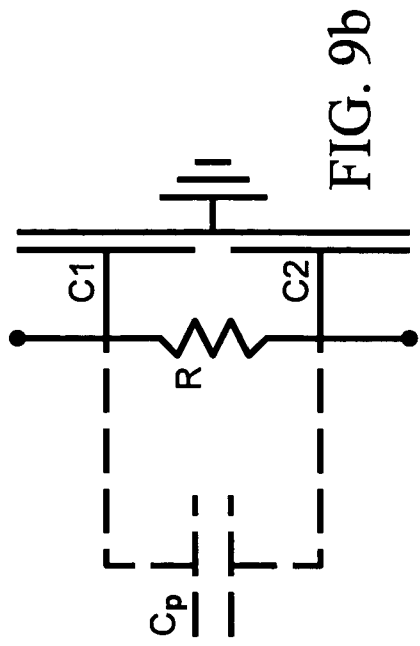
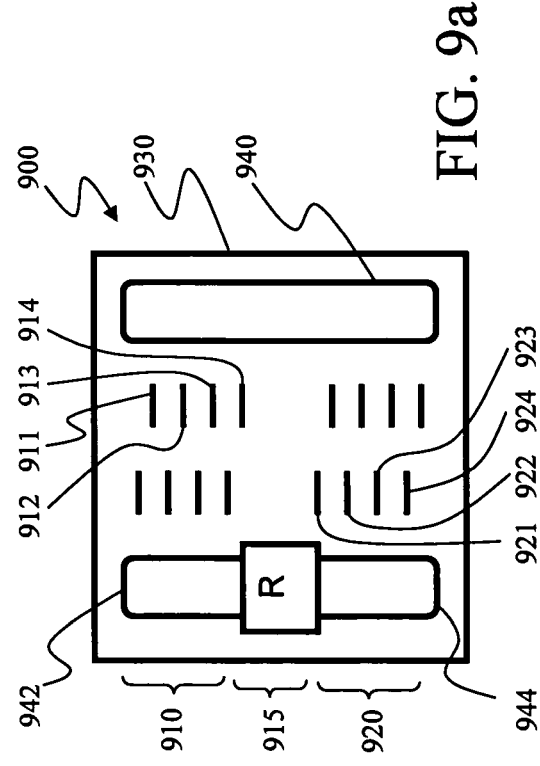
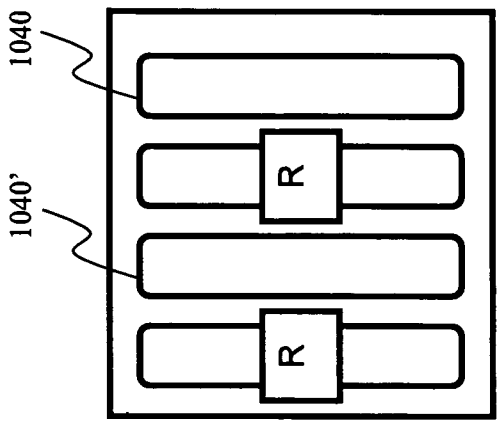
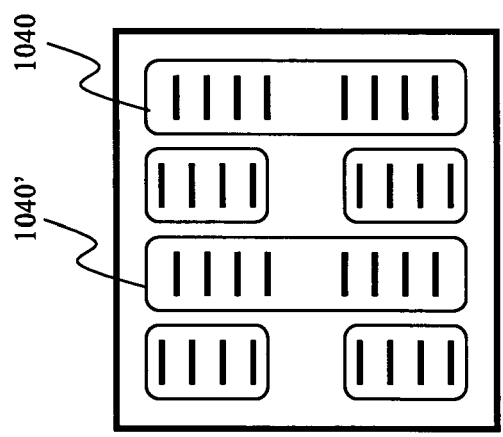
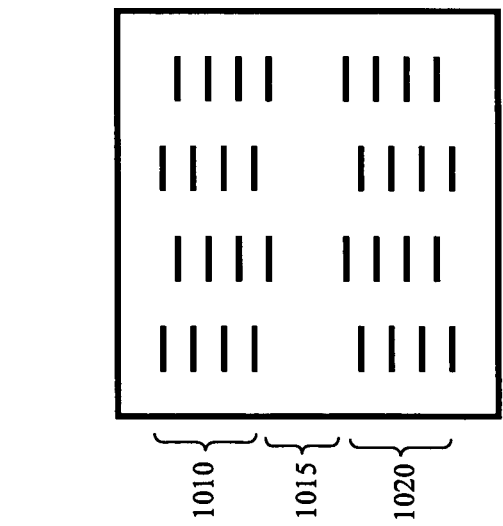

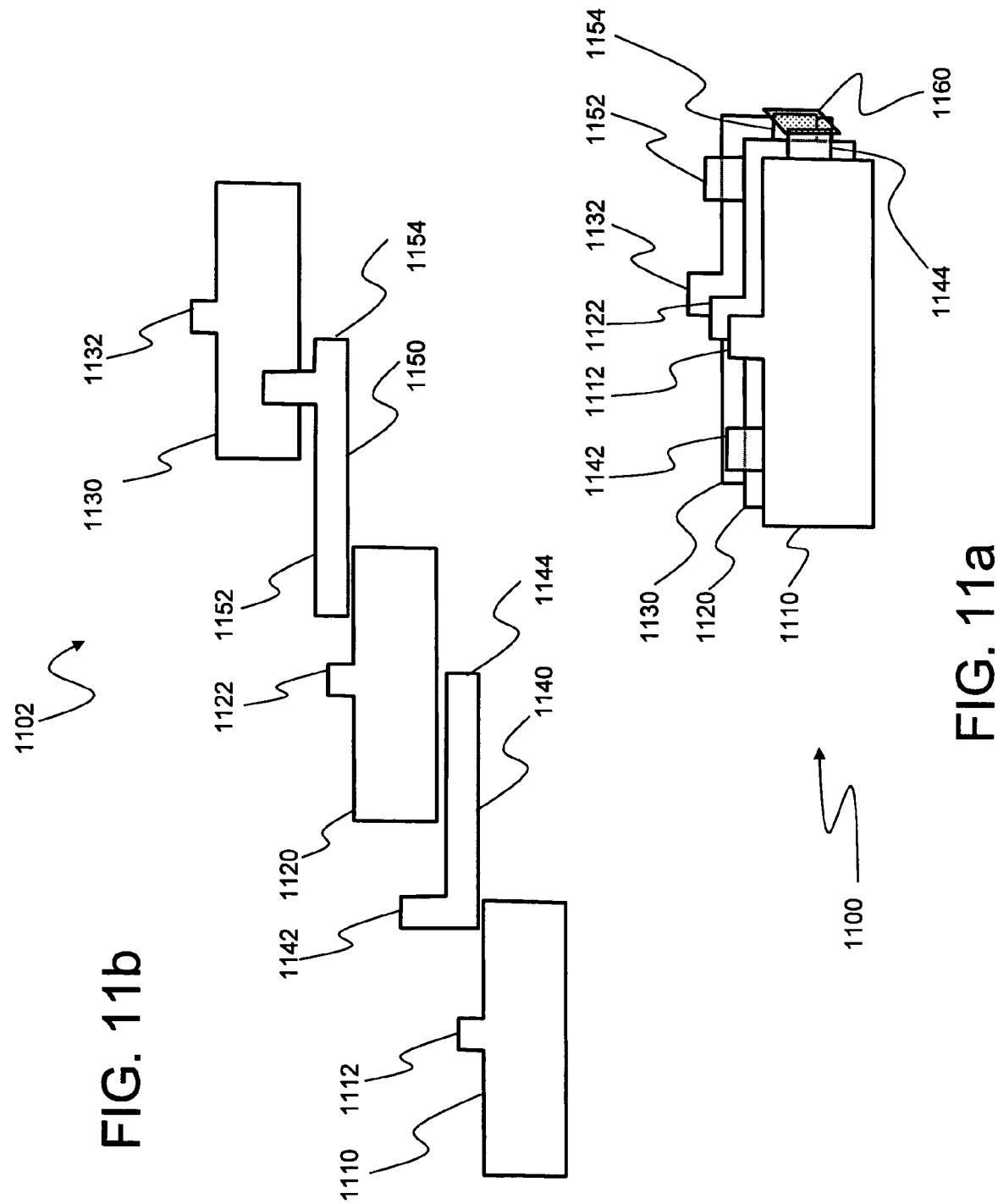

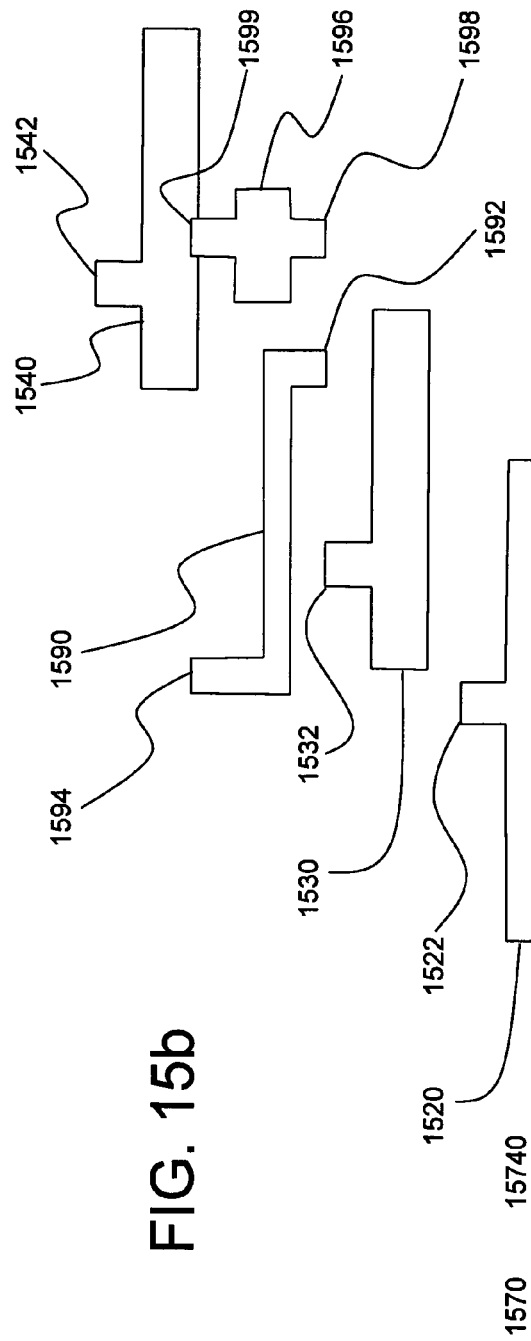
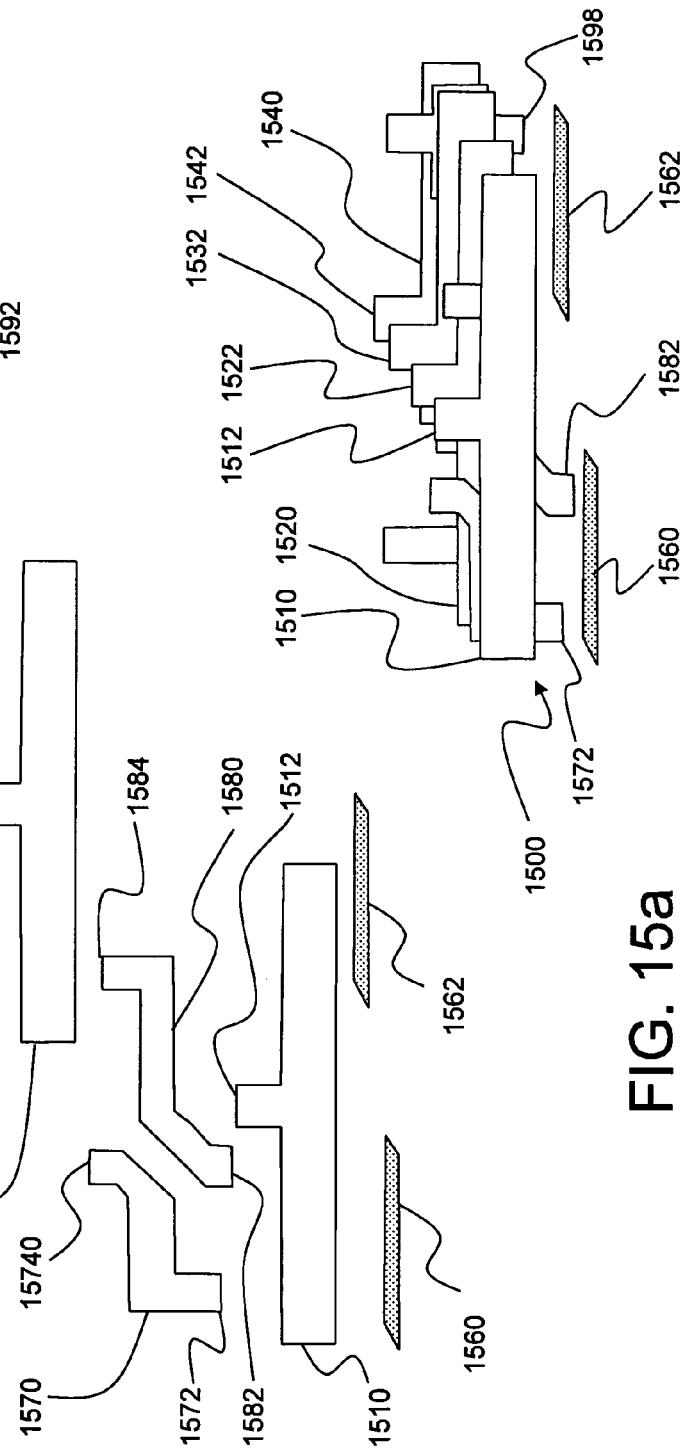
FIG. 15b
FIG. 15a

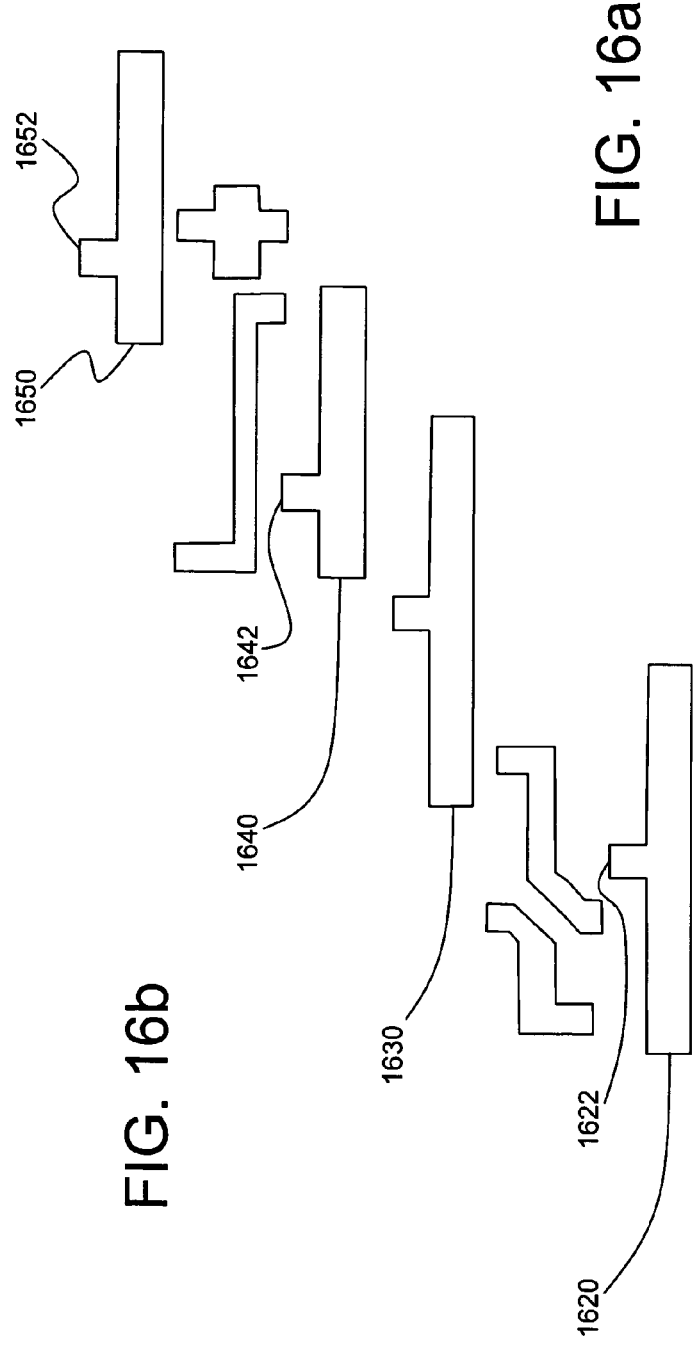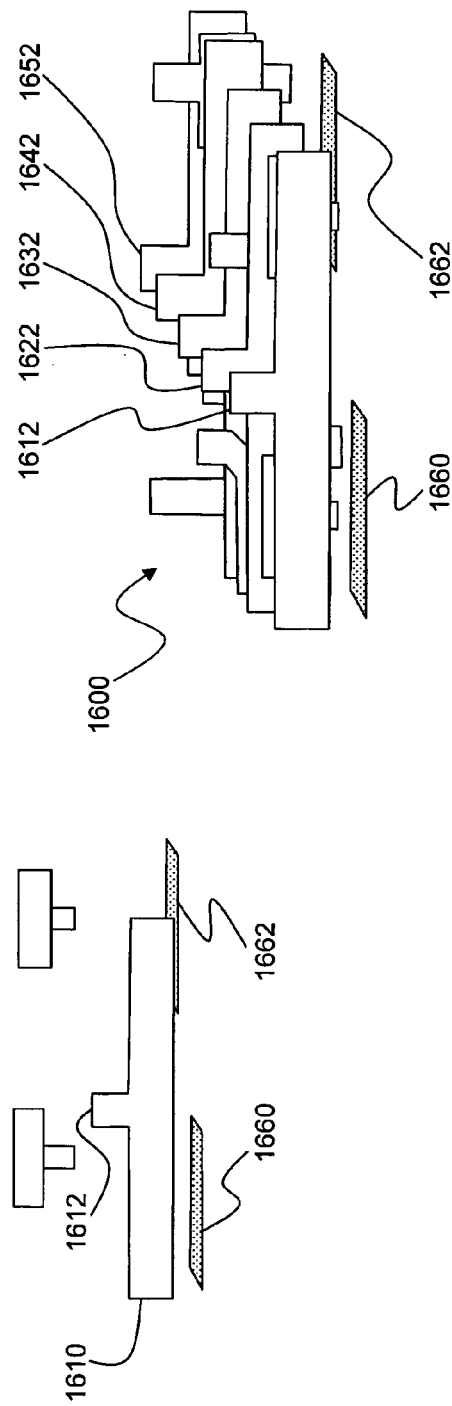

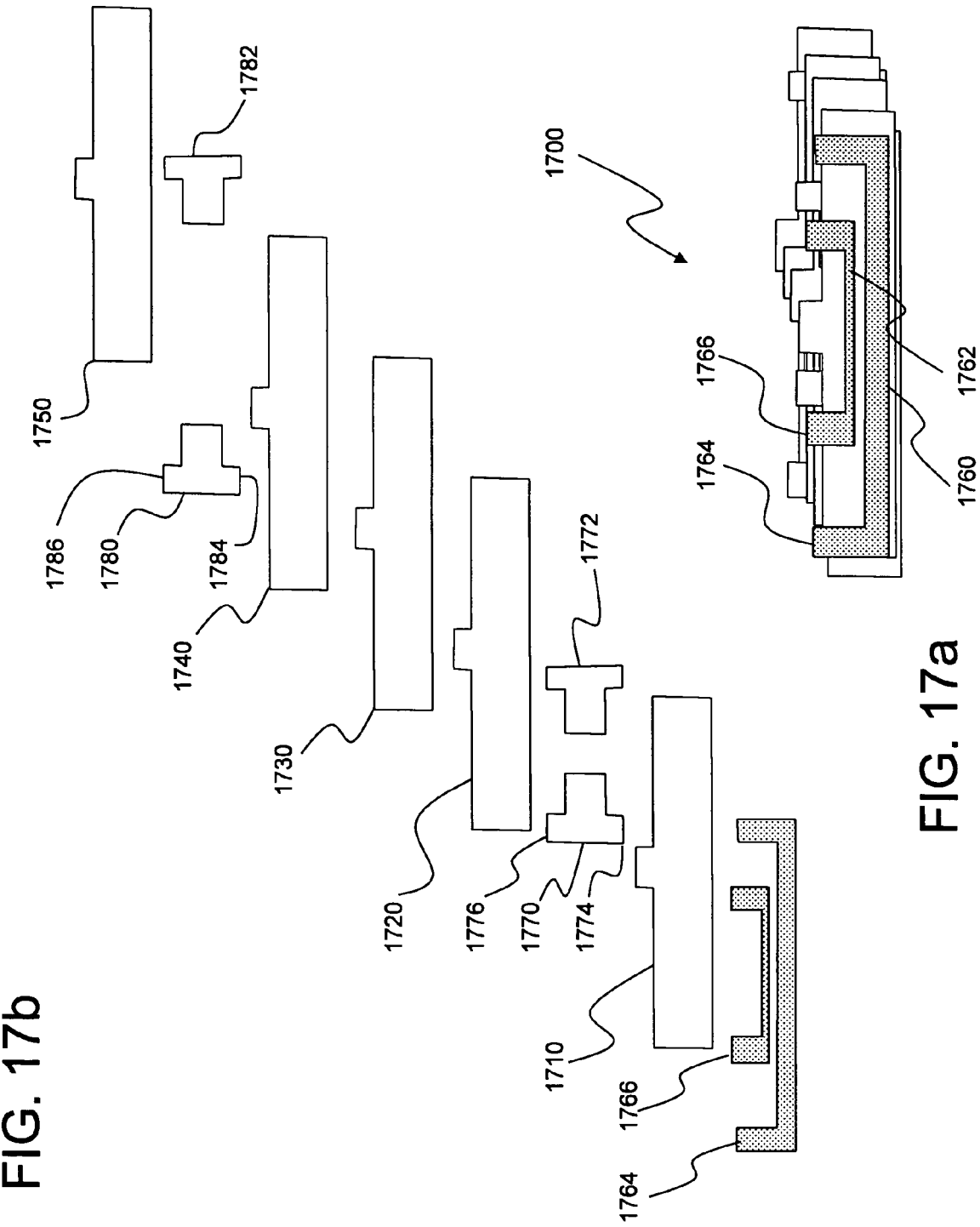

MULTILAYER VERTICALLY INTEGRATED ARRAY TECHNOLOGY

PRIORITY CLAIM

This application claims the benefit of previously filed U.S. Provisional Patent Application entitled "VERTICALLY INTEGRATED VARISTOR ARRAY" by named co-inventors Carl L. Eggerding, Ronald S. Demcko, and John L. Galvagni, and assigned U.S. Ser. No. 60/733,964, filed Nov. 4, 2005, and which is incorporated herein by reference for all purposes.

BACKGROUND OF THE INVENTION

The present subject matter generally concerns arrays and related methodology. More particularly, the present subject matter concerns a multilayer components (for example, such as varistors) with interdigitated electrode layer portions configured so as to variously provide signal filtering characteristics, over-voltage transient suppression capabilities, and land grid array (LGA) terminations.

Integrated circuits (ICs) have been implemented for some time, but many specific features of these ICs affect the design criteria for electronic components and corresponding procedures for mounting such components. With increased functionality of integrated circuit components, the design of electronic components must become increasingly more efficient. The miniaturization of electronic components is a continuing trend in the electronics industry, and it is of particular importance to design parts that are sufficiently small, yet simultaneously characterized by high operating quality. Components are desired that are small in size and that have reliable performance characteristics, yet can also be manufactured at relatively low costs.

Component miniaturization enables higher density mounting on circuit boards or other foundations. Thus, the spacing between components is also a limiting factor in present circuit designs. Since spacing is such a critical design characteristic, the size and location of termination means or elements for IC components is also a significant design characteristic.

One specific electronic component that has been used in IC applications is the decoupling capacitor. Decoupling capacitors are often used to manage electrical noise problems that occur in circuit applications. As such, one of their functions is to operate as a filter. Dramatic increases in packing density of integrated circuits require advancements in decoupling capacitor technology. It has been found that one way to achieve improved performance of decoupling capacitors and at the same time allow for increased packaging density is to provide improved filtering characteristics and, at the same time, incorporate additional functionality in the form of transient suppression.

Several design aspects have been implemented in prior decoupling capacitors to reduce self and mutual inductance. For example, it has been shown that reducing the current path through such devices will lower self-inductance. Since the current often has to travel the entire length of the capacitor, termination on the longer ends of the structure will reduce the current path. If the current in adjacent capacitor electrodes flows in opposite directions it will reduce the mutual inductance in a capacitor. Multiple terminations as utilized in interdigitated capacitor technology lower the inductance value.

Another approach to lowering the equivalent series inductance (ESL) of a decoupling capacitor is to minimize interconnect induction that results from termination configurations and mounting systems. Typical termination schemes incorporate long traces to the capacitor electrode pads.

Examples of various aspects and alternative embodiments in the field of integrated circuits (ICs), and particularly for example, regarding multilayer decoupling capacitors, have been implemented for some time. Some exemplary specific features and aspects of ICs and associated electronic components and corresponding procedures for mounting such components include as follows. U.S. Pat. No. 4,831,494 (Arnold, et al.) is entitled "Multilayer capacitor" and discloses what it describes as a multilayer capacitor consisting of a plurality of laminae with each of the laminae including a conductive plate portion and a non-conductive sheet portion. The conductive plate portion has at least one tab projecting to at least one edge of the conductive plate portion with the maximum number of tabs per conductive plate portion being limited to avoid excessive lateral congestion. The laminae are divided into different groups with the laminae from each group having the same number and location of tabs and with the laminae from different groups differing by at least the location of the tabs. The laminae are interleaved so that: (a) a lamina from one group alternates with a lamina from a different group, (b) the conductive plate portion of each lamina is in contact with the non-conductive sheet portion of each adjacent lamina, (c) the tabs are at a common edge of each lamina so that the tabs of the interleaved laminae form rows of tabs, and (d) the tabs from adjacent laminae are not in registry with each other. The capacitor finally includes islands of metallurgy joining selected groups of tabs in each row such that each of the islands covers a portion of each row of tabs.

U.S. Pat. No. 5,799,379 (Galvagni, et al.) is entitled "Method of manufacturing a decoupling capacitor structure" and discloses what it describes as a capacitor structure described as having a plurality of dielectric materials located so that each dielectric material is in parallel between capacitor plates. The capacitor value of this structure is preset, therefore, for operation electrically at different specific temperatures. The description gives a specific stacked arrangement for the various dielectric materials in which this capacitor can be formed, as one example of that to which it is adaptable.

U.S. Pat. No. 6,757,152 (Galvaqni, et al.) is entitled "Cascade capacitor" and discloses what it describes as multi-layer and cascade capacitors for use in high frequency applications and other environments. Such subject capacitor may have multiple capacitor components or aspects thereof in an integrated package. Such components may include, for example, thin film BGA components, interdigitated capacitor (IDC) configurations, double-layer electrochemical capacitors, surface mount tantalum products, multilayer capacitors, single layer capacitors, and others. Exemplary embodiments of such subject matter preferably encompass at least certain aspects of thin film BGA techniques and/or IDC-style configurations. Features for attachment and interconnection are provided that facilitate low ESL while maintaining a given capacitance value. Additional advantages include low ESR and decoupling performance over a broad band of operational frequencies. More particularly, such disclosed technology provides for exemplary capacitors that may function over a frequency range from kilohertz up to several gigahertz, and that may also be characterized by a wide range of capacitance values. An additionally disclosed feature of such subject matter is to incorporate dielectric layers of varied thicknesses to broaden the resonancy curve associated with a particular configuration.

U.S. Pat. No. 7,016,175 (MacNeal et al.) is entitled "Window via capacitor" and discloses what it describes as a window via capacitor which comprises a stacked multilayer configuration of at least one bottom layer, a plurality of first and second layers, a transition layer and a cover layer. Each first and second layer is preferably characterized by a sheet of dielectric material with a respective first or second electrode plate provided thereon. Adjacent first and second electrode plates form opposing active capacitor plates in the multilayer configuration. Portions of each first and second electrode plate extend to and are exposed on selected periphery side portions. Electrode portions of each transition layer are aligned in respective similar locations to the first and second electrode plates such that peripheral terminations can connect selected electrode portions of a first polarity together and selected portions of the opposing polarity together. Solder balls may also be applied to window vias to yield a capacitor compatible with BGA mounting technology.

U.S. Pat. No. 4,039,997 (Huang. et al.) is entitled "Resistance material and resistor made therefrom" and discloses what it describes as a vitreous enamel resistance material comprising a mixture of a vitreous glass frit and fine particles of a metal silicide of the transition elements of Groups IV, V and VI of the periodic chart. The metal silicide may be of molybdenum disilicide (MoSi.sub.2), tungsten disilicide (WSi.sub.2), vanadium disilicide (VSi.sub.2), titanium disilicide (TiSi.sub.2), zirconium disilicide (ZrSi.sub.2), chromium disilicide (CrSi.sub.2) or tantalum disilicide (TaSi.sub.2). The ingredients of the vitreous enamel resistance material are present in the proportion of, by weight, 25 to 90% glass frit and 75 to 10% metal silicide. An electrical resistor is made with the vitreous enamel resistor material of the present subject matter by coating a ceramic substrate with the vitreous enamel resistance material and firing the coated substrate at a temperature sufficient to melt the glass frit of the vitreous enamel resistance material. Upon cooling, the glass hardens so that the resultant resistor comprises the substrate having on the surface thereof a film of glass with the metal silicide particles embedded in and dispersed throughout the glass film.

U.S. Pat. No. 4,286,251 (Howell) is entitled "Vitreous enamel resistor and method of making the same" and discloses what it describes as a vitreous enamel resistor, and method of making the same comprising the steps of applying to the surface of a substrate and firing a mixture of glass frit and particles of a precious metal oxide such as iridium oxide, ruthenium oxide, and mixtures thereof. The mixture is fired in a neutral, inert, or reducing atmosphere for a time and at a temperature resulting in a controlled partial dissociation of the oxide and softening of the glass frit. When cooled, a resistor is provided having a glass film with conductive particles therein strongly bonded to the substrate. The resistor produced can be terminated by the use of electroless plating.

The disclosures of the foregoing United States patents are hereby fully incorporated into this application for all purposes by reference thereto. While examples of various aspects and alternative embodiments are known in the field of multilayer decoupling capacitors, no one design is known that generally encompasses all of the above-referenced preferred characteristics.

BRIEF SUMMARY OF THE INVENTION

In view of the discussed drawbacks and other shortcomings encountered in the prior art, and recognized and addressed by the present subject matter, improved multilayer vertically integrated array technology has been developed. Thus, broadly speaking, a general object of the presently disclosed technology is to provide improved functionality schemes through various configurations of multilayer vertically integrated arrays. Also, broadly speaking, a general object of the presently disclosed technology is to provide improved functionality corresponding methodologies for practice with, and practice of, the various aforementioned present configurations of multilayer vertically integrated arrays.

It is another general object of the present subject matter to provide a multilayer vertically integrated array that facilitates closer component spacing in an integrated circuit environment.

It is another object of the present subject matter to provide multilayer vertically integrated array technology that is compatible with a land grid array packaging configuration.

It is yet another object of the present subject matter to provide a multilayer vertically integrated array with configurable equivalent electrical characteristics including equivalent series inductance (ESL), equivalent series resistance (ESR), and configurable capacitance and voltage clamping values.

It is still another object of the present subject matter to provide multilayer vertically integrated arrays with interdigitated electrode configurations that may define a single capacitor, a capacitor array, or resistive, inductive, and/or capacitive (RLC) combinations providing various signal filtering capabilities.

It is a further object of the present subject matter to provide improved multilayer vertically integrated arrays corresponding to various RLC combinations that further provide transient voltage suppression features.

One present exemplary embodiment relates to a multilayer vertically integrated array, comprising a plurality of electrode layers arranged in substantially parallel positions; a plurality of electrode tabs respectively associated with such electrode layers and extending from alternating electrode layers so as to be aligned in respective columns, such plurality of electrode tabs respectively having a plurality of end portions; encasing material completely surrounding such electrode layers but with such end portions of such tabs remaining exposed at the surface of such encasing material; and at least one termination land for electrically connecting with selected at least one of such exposed end portions of such tabs.

In the foregoing exemplary embodiment, preferably such multilayer vertically integrated array may further include a plurality of such termination lands for electrically connecting with respective selected groups of such exposed end portions of such tabs; and such encasing material may comprise one of dielectric material so that such array comprises a multilayer capacitor or may comprise varistor material so that such array comprises a multilayer capacitor with transient overvoltage suppression capabilities.

In yet further embodiments of the foregoing exemplary present subject matter, at least some of such plurality of electrode layers respectively comprise a plurality of predetermined shaped electrodes for relative increased inductance and resistance within such array, with at least one of such electrode layers comprising a common electrode situated centrally between pluralities of such predetermined shaped electrodes. In various of such embodiments, such predetermined shapes for such predetermined shaped electrodes comprise at least one of U-shaped, L-shaped, serpentine-shaped, S-shaped, and I-shaped electrodes.

In yet another present exemplary embodiment, a multilayer vertically integrated capacitor array compatible with a land grid array packaging configuration may be provided, comprising a stacked plurality of layers arranged in substantially parallel positions; a ground plane layer centrally formed in such stacked plurality of layers, such ground plane layer forming a plurality of window vias therein; a plurality of via connection points formed respectively in the other of such plurality of layers, such via connection points formed in respective columns so as to be aligned with such window vias of such ground plane layer; ball limiting metallurgy formed at such via connection points of one of such other layers situated towards an exterior surface of such array; encasing material completely surrounding such layers but with such ball limiting metallurgy remaining exposed at such exterior surface of such array; a plurality of capacitor electrodes supported on one of such other layers; a central conductive trace supported on such one of such other layers for electrical coupling with such ground plane layer; and a plurality of resistive elements supported on other of such other layers, so that such capacitor elements, such ground plane layer, and selected of such resistive elements may be coupled together by way of conductive vias.

In one exemplary embodiment of the foregoing arrangement, such array comprises a five by five matrix configuration of five layers, with a first layer thereof comprising such one of such other layers situated towards an exterior surface of such array, with a second layer thereof comprising such one of such other layers on which such plurality of capacitor electrodes and such central conductive trace are supported, with a third layer thereof comprising such central ground plane layer, and with fourth and fifth layers thereof comprising such other of such other layers on which such plurality of resistive elements are supported.

It is to be understood that the present subject matter equally relates to corresponding methodology for providing a multilayer vertically integrated array, which advantageously results in providing an array with configurable equivalent electrical characteristics. An exemplary such present methodology comprises: providing a plurality of electrode layers arranged in substantially parallel positions; respectively associating a plurality of electrode tabs with such electrode layers and extending such tabs from alternating electrode layers so as to be aligned in respective columns, such plurality of electrode tabs respectively having a plurality of end portions; completely surrounding such electrode layers with encasing material but with such end portions of such tabs remaining exposed at the surface of such encasing material; and providing at least one termination land for electrically connecting with selected at least one of such exposed end portions of such tabs.

In such exemplary methodology, a plurality of such termination lands may be provided for electrically connecting with respective selected groups of such exposed end portions of such tabs; and the encasing material may be formed of either dielectric material so that such array comprises a multilayer capacitor, or varistor material so that such array comprises a multilayer capacitor with transient overvoltage suppression capabilities.

In another present exemplary method for providing a multilayer vertically integrated capacitor array compatible with a land grid array packaging configuration, and with configurable equivalent electrical characteristics, such methodology may comprise: stacking a plurality of layers arranged in substantially parallel positions; providing a ground plane layer centrally formed in such stacked plurality of layers, and forming a plurality of window vias in such ground plane layer; forming a plurality of via connection points respectively in the other of such plurality of layers, such via connection points formed in respective columns so as to be aligned with such window vias of such ground plane layer; forming ball limiting metallurgy at such via connection points of one of such other layers situated towards an exterior surface of such array; completely surrounding such layers with encasing material but with such ball limiting metallurgy remaining exposed at such exterior surface of such array; providing a plurality of capacitor electrodes supported on one of such other layers; providing a central conductive trace supported on such one of such other layers for electrical coupling with such ground plane layer; and providing a plurality of resistive elements supported on other of such other layers, so that such capacitor elements, such ground plane layer, and selected of such resistive elements may be coupled together by way of conductive vias.

In a particular embodiment of such exemplary present method, the methodology may involve forming such array as a five by five matrix configuration of five layers, with a first layer thereof comprising such one of such other layers situated towards an exterior surface of such array, with a second layer thereof comprising such one of such other layers on which such plurality of capacitor electrodes and such central conductive trace are supported, with a third layer thereof comprising such central ground plane layer, and with fourth and fifth layers thereof comprising such other of such other layers on which such plurality of resistive elements are supported.

Additional objects and advantages of the disclosed technology are set forth in, or will be apparent to those of ordinary skill in the art from, the detailed description herein. Also, it should be further appreciated that modifications and variations to the specifically illustrated, referenced and discussed features hereof may be practiced in various embodiments and uses of this subject matter without departing from the spirit and scope thereof, by virtue of present reference thereto. Such variations may include, but are not limited to, substitution of equivalent means, features, and/or steps for those illustrated, referenced or discussed, and the functional, operational or positional reversal of various parts, features, steps, or the like.

Still further, it is to be understood that different embodiments, as well as different presently preferred embodiments, of this subject matter may include various combinations or configurations of presently disclosed features, elements, or steps or their equivalents including combinations of features, parts, or steps or configurations thereof not expressly shown in the figures or stated in the detailed description.

Additional embodiments of the present subject matter, not necessarily expressed in this summarized section, may include and incorporate various combinations of aspects of features or steps or parts referenced in the summarized objectives above, and/or other features, parts, elements, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 1a, 2a, 3a, 4a, 5a, and 6a illustrate partially perspective views of exemplary embodiments of electrode layer configurations (partially exploded and inverted with respect to normal circuit board connection orientation) for use in multilayer vertically integrated arrays in accordance with the present subject matter;

FIGS. 1b, 2b, 3b, 4b, 5b, and 6b illustrate bottom (circuit board side) views of exemplary embodiments of multilayer vertically integrated array electrode layers and corresponding tabs disposed within a body of material with termination lands in accordance with present subject matter;

FIGS. 1c, 3c, 4c, and 5c illustrate top views of exemplary embodiments of multilayer vertically integrated arrays showing embodiments wherein electrode tabs are not exposed through the body material;

FIGS. 2c and 6c illustrate top views of exemplary embodiments of multilayer vertically integrated arrays showing embodiments wherein electrode tabs are exposed through the body material;

FIG. 7a illustrates a top view of a multilayer vertically integrated array similar to that of FIG. 1b but having termination lands configured to allow formation of a Pi-filter arrangement;

FIG. 7b illustrates an equivalent circuit corresponding to the multilayer vertically integrated array of FIG. 7a;

FIG. 8a illustrates a top view of the multilayer vertically integrated array of FIG. 7a with selectively placed resistor elements and selectively coupled lands configuring the array to form a Pi-filter;

FIGS. 8b and 8c correspond to equivalent circuits for the Pi-filter formed by the multilayer vertically integrated array and resistor combination of FIG. 8a;

FIGS. 9a and 9b illustrate, respectively, a physical configuration and equivalent circuit of an exemplary filter produced using the multilayer vertically integrated array of FIG. 1a;

FIGS. 10a, 10b, and 10c illustrate sequential steps in configuring a multilayer vertically integrated array to produce a filter with reduced parasitic capacitance by altering the order of electrodes;

FIGS. 11a and 11b illustrate substantially assembled and exploded views of an alternate embodiment of a multilayer vertically integrated array wherein electrode tabs are exposed through top and side portions of the body material;

FIGS. 15a, 15b, 16a, and 16b illustrate substantially assembled and exploded views of yet other exemplary embodiments of the multilayer vertically integrated array wherein electrode tabs are exposed through top and bottom portions of the body material;

FIGS. 17a and 17b illustrate yet another exemplary embodiment of the present technology wherein resistor elements are incorporated into the array structure.

Figure 4A:
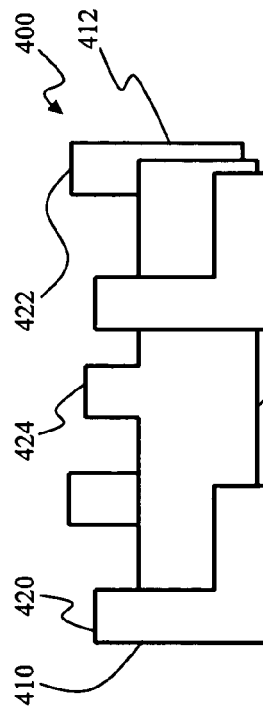

Repeat use of reference characters throughout the present specification and appended drawings is intended to represent same or analogous features, elements, or steps of the present subject matter. Also, it should be appreciated that certain elements, features, or associated steps of the drawings may not be drawn to scale or in dimensional proportion to other elements or features of the drawings.

DETAILED DESCRIPTION OF THE DRAWINGS

As referenced in the Brief Summary of the Invention section, supra, the present subject matter is particularly concerned with multilayer vertically integrated arrays providing multiple functionality schemes. It should be noted that each of the exemplary embodiments should not insinuate limitations of the present subject matter. Features illustrated or described as part of one embodiment may be used in combination with another embodiment to yield yet further embodiments. Additionally, certain features may be interchanged with similar devices or features though not expressly mentioned which perform the same or similar function(s).

Reference will now be made in detail to the presently preferred embodiments of the present subject matter. Referring to the drawings, FIGS. 1a, 1b, and 1c illustrate an exemplary multilayer vertically integrated array 100 comprising a plurality of electrode layers 110 and 112 and a plurality of electrode tabs 114 for use in a multilayer capacitor or capacitor array. Electrode layers 110 and 112 are arranged in a generally parallel fashion with tabs 114 extending from the layers such that electrode tabs 114 extending from alternating electrode layers are aligned in respective columns that may be electrically connected via termination lands 120, 122.

Electrode layers 110 and 112 are encased in material 130 such that while the electrode layers 110, 112 are completely encased in material 130, the end portions of tabs 114 remain exposed at the surface of material 130 such that the tabs 114 may be connected via termination lands 120, 122 as previously mentioned. Encasing material 130 may correspond to a number of different materials with varying electrical characteristics such that dual functionality may be achieved within the multilayer vertically integrated array 100. In an exemplary configuration, material 130 may correspond to a varistor material such that the multilayer vertically integrated array 100 may correspond to a multilayer capacitor with transient overvoltage suppression capabilities. Such exemplary configuration yields a multilayer vertically integrated array arrangement of electrode layers as potentially applicable for use in some embodiments of the present subject matter.

The exemplary illustration of FIGS. 1a, 1b, and 1c depicts a total of four electrode layers 110 and 112 with corresponding tabs 114, but typical arrangements as utilized in conjunction with the present subject matter may vary and may often contain many more electrode layers and/or respective tabs as is suggested via the broken line portion of FIGS. 1b and 1c. Such feature provides the design option of creating capacitive elements with a large range of capacitance values by choosing the number and size of electrodes.

The arrangement as depicted in FIGS. 2a, 2b, and 2c provides an electrode configuration with generally low equivalent series inductance (ESL). Both the self and mutual inductance of the element are generally lowered due to the exemplary interdigitated electrode tab configuration. Current flows in such exemplary capacitor plates are referenced by up arrows (unnumbered) and down arrows (unnumbered), where the up arrows display the direction of current flow in alternating electrode layers 210, and the down arrows display the direction of current flow in electrode layers 212 that are displaced between the defined alternating layers 210. Since the current does not have to travel the entire length of both electrodes to complete the circuit, self-inductance of the device is lowered.

In order to achieve improved filtering functionality in accordance with the present technology, it is necessary to control the electrical characteristics of the multilayer vertically integrated array so as to maximize desired characteristics in dependence on the particular type of filtering functionality desired. Various approaches to address these goals are illustrated in FIGS. 3a-6c.

Figure 3A:
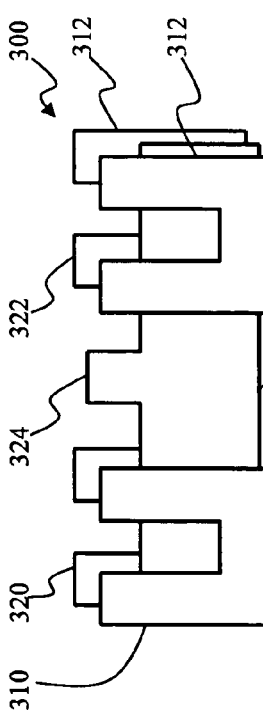
Figure 3B:
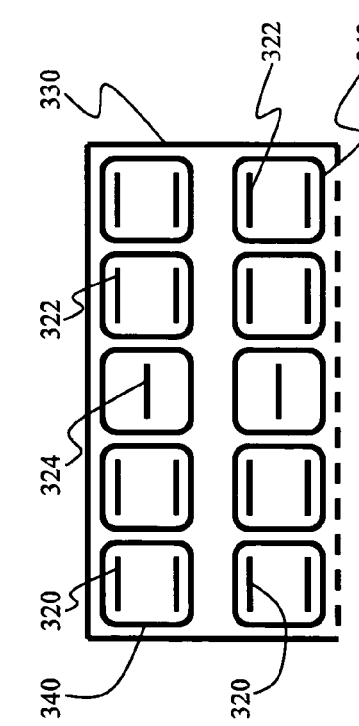
Figure 3C:

With respect to FIGS. 3a-3c, there is illustrated an embodiment of a multilayer vertically integrated array in accordance with the present technology wherein an electrode configuration is configured such that opportunities are provided for increased inductance and resistance within the array. More particularly, electrodes 310 and 312 are configured as "U-shaped" electrodes so as to provide increased inductance and resistance over that provided from electrodes 110, 112 of the embodiment illustrated in FIG. 1a. In addition, a common electrode 314 is provided and placed centrally between pluralities of the U-shaped electrodes 310, 312.

As with the previously discussed embodiments, the three layers of electrodes illustrated in FIG. 3a are merely exemplary as illustrated by the dual sets of electrodes of FIG. 3b as well as the broken line portions of FIGS. 3b and 3c that are meant to suggest that a plurality of sets of electrode layers are contemplated. Moreover, also as with the previously discussed embodiments, material 330 encasing electrodes 310, 312, and 314 may correspond to a material of varying electrical characteristics including both dielectric and varistor material. The provision of material 330 as a varistor material provides the option of providing transient overvoltage suppression to the multilayer vertically integrated array component produced.

With respect to the embodiment illustrated in FIGS. 3a-3c, it will be observed that there are illustrated a number of termination lands 340, 342 (FIG. 3b) that electrically interconnect selected of the tabs 320, 322, 324, associated with electrodes 310, 312, and 314, respectively. Such interconnect allows not only for selected configuration of the connections between different electrode layers and consequent adjustment of the effective or equivalent inductance, resistance and capacitance of the array, but also provides for external (to the array per se) connection of other elements as will be further addressed later. It should be noted that while there is a reduction in the capacitance produced between electrodes 310, 312 and common electrode 314 over that provided between electrodes 110 and 112 of the FIG. 1a embodiment, such differences might be controlled to provide component values that may be used to good advantage in selected filter designs.

Figure 4B:
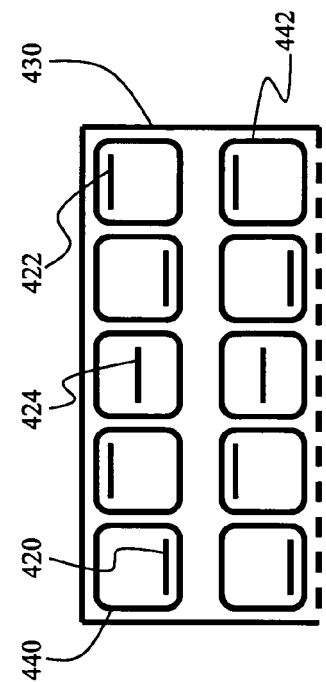
Figure 4C:
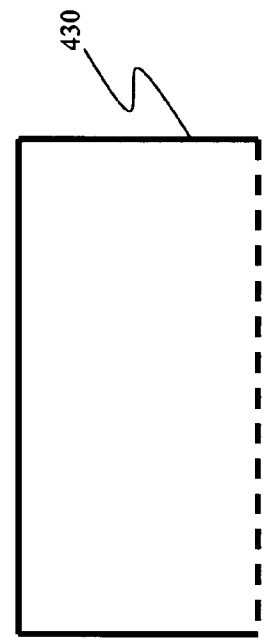

Turning now to the exemplary embodiment of the present technology illustrated in FIGS. 4a-4c, it will be seen that the electrode configuration illustrated is somewhat similar to that illustrated in FIGS. 3a-3c except that electrodes 410, 412 are configured in an "L-shaped" form. The L-shaped configuration of electrodes 410, 412 provides, in a manner similar to electrodes 310, 312 of the FIG. 3a-3c embodiment, for increased inductance and resistance values over those provided by electrodes 110, 112 of the FIG. 1a embodiment. As with the exemplary embodiment illustrated in FIGS. 3a-3c, the embodiment of FIGS. 4a-4c provides similar termination lands 440, 442 providing connection options for tabs 420, 422, 424. In addition, material 430 encasing electrodes 410, 412, 414 is similar to material 330 and also offers the possibility of providing transient overvoltage protection to components made in accordance with the configuration illustrated in FIGS. 4a-4c.

Figure 5A:
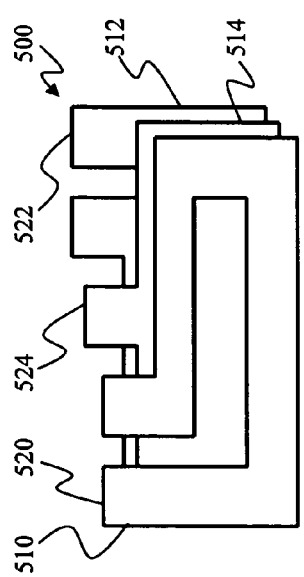
Figure 5B:
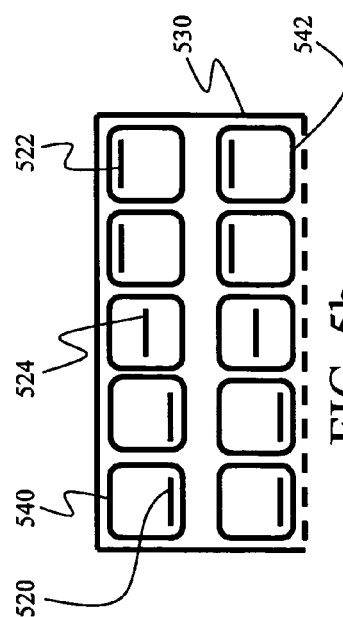
Figure 5C:
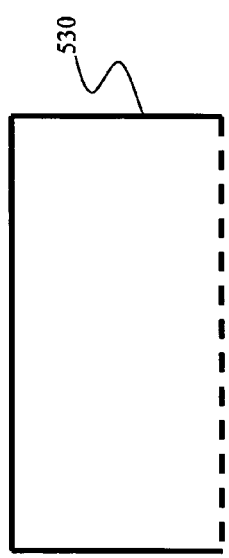

The exemplary embodiment of the present technology illustrated in FIGS. 5a-5c illustrates yet another electrode configuration. As shown in FIG. 5a, electrodes 510, 512 follow a serpentine path extending from one side of the array body to the other, a configuration offering a significant increase in both equivalent inductance and resistance over that offered by any of the previously discussed embodiments. In addition, termination lands 540, 542 cooperate with tabs 520, 522, 524 associated with electrodes 510, 512, 514, respectively, in a manner similar to the previously discussed embodiments to provide electrical interconnection options for the various electrode layers. Variously selectable material 530 also corresponds to previously discussed materials 330 and 430 and offers similar options for components constructed in accordance with the electrode patterns illustrated in FIG. 5a including transient overvoltage protection if a varistor material is selected for material 530. A dielectric material may be selected as material 530 if transient overvoltage features are not desired or required for the produced component array.

Figure 6A:
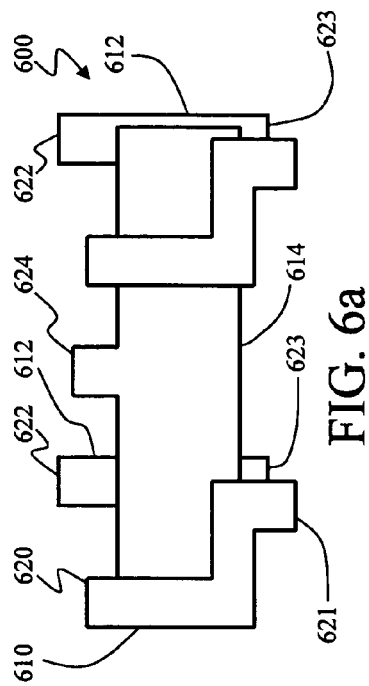

At this time it may be noted that most of the electrode configurations discussed to this point have been substantially symmetrical from layer to layer within the multilayer vertically integrated arrays. More specifically, U-shaped electrodes 310 shown in full view in FIG. 3a are actually identical in shape to partially hidden electrodes 312 of FIG. 3a. Similarly, L-shaped electrodes 410 shown in full view in FIG. 4a are mirror images of partially hidden electrodes 412 of FIG. 4a. Likewise serpentine electrodes 510 shown in full view in FIG. 5a are mirror images of partially hidden electrodes 512 of FIG. 5a. In each of these cases it will be further noted that the various tabs associated with their respective electrodes are all exposed only on the board side of the multilayer vertically integrated array. With reference now to FIG. 6a, it will be seen that such symmetry and single surface tab exposure are not requirements of the present technology, as differing electrode and tab configurations may be employed to good advantage in producing a multilayer vertically integrated array.

Figure 6B:
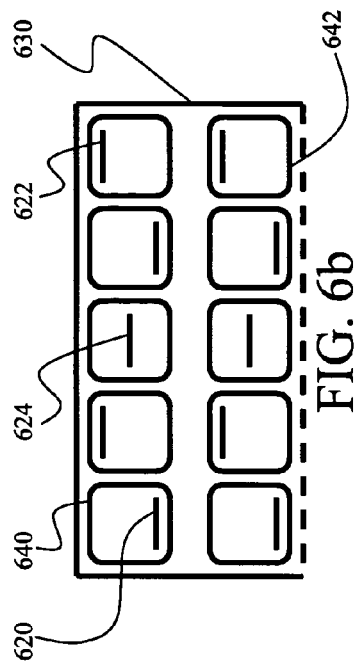
Figure 6C:
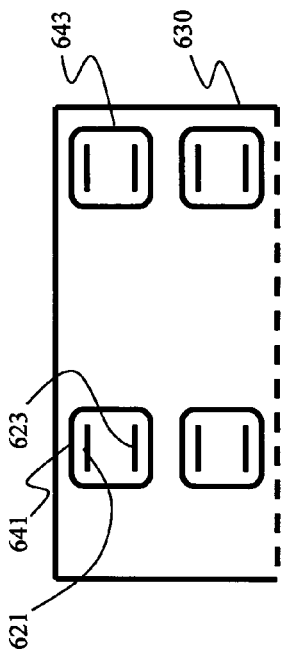

FIGS. 6a, 6b, and 6c collectively illustrate a further exemplary embodiment of the present technology. As seen in FIG. 6a, non-symmetrical, non-mirrored electrodes 610, 612 are provided on either side of common electrode 614. Electrode 610, seen in full view in FIG. 6a may be described as an S-shaped electrode and has tab portions 620 and 621 extending to the bottom (board side) and top surfaces, respectively, of the multilayer vertically integrated array 600. Partially hidden electrode 612, on the other hand, may be considered I-shaped as it extends straight through from one side to the other of the multilayer vertically integrated array 600 with associated tab portions 622, 623 extending to the bottom (board side) and top surfaces, respectively, of the multilayer vertically integrated array 600. Termination lands 640, 642 are provided on the board side of the multilayer vertically integrated array 600 in a manner similar to termination lands 540, 542 of FIG. 5b and similar termination lands illustrated in FIGS. 1b, 2b, 3b, and 4b. In addition to termination lands 640, 642, the embodiment here illustrated also provides termination lands 641 and 643 on the top surface of the multilayer vertically integrated array 600. Such termination lands 641, 643 provide additional configuration opportunities for the multilayer vertically integrated array 600 including the opportunity to externally connect electrodes 610 and 612 together to provide both increased equivalent inductance and equivalent resistance as well as to provide the option to connect additional external components as will be more fully described later with respect to FIGS. 8a, 8b, and 8c.

As with previously described embodiments, the exemplary embodiment of the present technology illustrated in FIGS. 6a, 6b, 6c illustrates the inclusion of material 630 that, like the corresponding materials 130, 230, 330, 430, and 530, provides the option of including a varistor material between the electrodes of the multilayer vertically integrated array to provide the optional functionality of transient overvoltage protection for the produced array.

With brief reference now to FIGS. 7a and 7b, it will be seen that there is illustrated what may be described as a generally generic illustration of a multilayer vertically integrated array 700 in accordance with the present technology. The illustrated embodiment demonstrate that any of the previously described embodiments may be configured via termination land connections 720-726 to provide capacitive equivalent circuits as illustrated in FIG. 7b. Alpha designations A-H associated with both FIGS. 7a and 7b designate corresponding equivalent terminals for array 700. It is important to note that any and all of the previously illustrated electrode patterns may be used to good advantage to provide design variations in available equivalent inductance, resistance and capacitance for multilayer vertically integrated array 700. Moreover material 730, as with previously discussed equivalent materials, may be selected to be a varistor material to afford optional transient overvoltage protection to the produced array device or may be selected as a dielectric material if transient protection is not desired or necessary.

An illustration of the implementation of a Pi-filter in accordance with the present technology using external components in combination with a multilayer vertically integrated array will now be discussed with reference to FIGS. 8a, 8b, and 8c. It should be kept in mind that the exemplary embodiment of FIGS. 8a, 8b, and 8c may be, as was described with respect to FIG. 7a, based on any of the previously illustrated and discussed exemplary embodiments and electrode configurations.

With reference to FIG. 8a, there is illustrated and exemplary multilayer vertically integrated array 800 comprising a plurality of electrode plates encased in a housing 830 optionally composed of varistor or dielectric material. It will be noted that the exemplary embodiment illustrated in FIG. 8a carries the same termination land alpha designations A-H as those illustrated in FIG. 7a. As with the embodiment illustrated in FIG. 7a, these alpha designations A-H are placed to indicate connection points for one or more of the tab portions of the various electrode configurations previously described with respect to any of the previously described embodiments. For the sake of general discussion, it may be assumed that the electrode configuration encased within material 830 of the exemplary FIG. 8a embodiment corresponds to that illustrated in FIG. 1a. Thus the tab terminals 114 that are electrically connected by termination land 120 at the left most edge of the exemplary embodiment shown in FIG. 1b may be considered to correspond to the termination land 820 illustrated in the upper left corner of the exemplary embodiment of the present technology illustrated in FIG. 8a.

At this point it may be recalled that the description of the exemplary embodiment shown in FIGS. 1a-1c noted that the actual construction may correspond to a plurality of groups of electrodes as indicated by the broken line in the lower portion of each of FIGS. 1b and 1c. In this light, the electrode tabs connected together by termination land 821 (FIG. 8a) correspond to a portion of the not illustrated electrodes that are, non-the-less present in the array. These multiple layers of electrodes may be coupled together via variously configured termination lands so as to produce, in combination with externally secured additional components, a filter device with widely varying design possibilities.

In the exemplary embodiment illustrated in FIGS. 8a, 8b, and 8c, termination lands 820, 821, 824, and 825 connect together and provide connection points for a plurality of terminals in two physically parallel groupings of electrodes. Termination lands 822 and 826, on the other hand, connect together a plurality of terminals across both of the two physically parallel groupings of electrodes. Externally secured components, presently illustrated as resistors R1 and R2 may then be coupled between termination lands 820, 821 and 824, 825, respectively, to form a Pi-filter with equivalent circuits as illustrated in FIGS. 8b and 8c.

It should be well understood by this point that the illustrated selection of resistor components is merely exemplary and that other component types may also be used in dependence on the particular type of filter design desired. In addition, as discussed above, various of the herein disclosed electrode configuration may be selected so as to supply, as needed, additional inductance, resistance and/or capacitance to meet particular filter design requirements. As previously mentioned, any of these variously configured designs may be implemented using a varistor material as an encasing material so as to provide optional transient overvoltage suppression as a functional feature of the produced component.

Turning now to the exemplary embodiment of the present technology illustrated in FIG. 9a, it will be seen that the exemplary Pi-filter implementation there illustrated corresponds to an electrode configuration as illustrated in FIG. 1a. It will be further realized that the configuration of FIG. 9a represents two separate groupings of electrodes that may be designated as a first group 910 and a second group 920 that are separated by a gap 915. Within the first group 910 is shown a first sequence of electrodes as represented by exposed tabs 911-914 while within the second group 920, a second sequence of electrodes as represented by exposed tabs 921-924 is shown. An examination of these two sequences of electrodes reveals a point of possible concern in the development of filter designs using the present technology.

With occasional reference back to FIG. 1a, it will be realized that the electrodes comprising the multilayer vertically integrated array 900 corresponding to tabs 912 and 914 are electrically connected together via termination land 942 while the electrodes corresponding to tabs 921 and 923 are electrically connected together via termination land 940. The point of concern arises from the fact that termination land 940 also couples together the electrodes that are interspersed between the electrodes associated with tabs 912 and 914. This coupling between electrodes in adjacent groupings of electrodes gives rise to the formation of a parasitic capacitance $C_p$ as illustrated in the equivalent circuit representation of FIG. 9b.

To address this creation of a parasitic capacitor Cp, an embodiment in accordance with the present technology as illustrated in FIGS. 10a, 10b, and 10c has been developed. With reference to FIG. 10a it will be observed that two groups of electrodes 1010 and 1020 have been illustrated as separated by a gap 1015. Further it will be appreciated that the electrode sequences between the first group 1010 and the second group 1020 is reversed from each other. This reversal of electrode sequence between adjacent groups of electrodes results in the placement of electrodes nearest each other across gap 1015 to be such that they will ultimately be coupled together via termination lands 1040, 1040' spanning the two groups of electrodes. This reversed electrode sequencing between adjacent groupings of electrodes significantly reduces formation of any parasitic capacitance within the produced filter.

FIGS. 11a and 11b, respectively illustrate substantially assembled 1100 and exploded 1102 views of an alternate embodiment of a multilayer vertically integrated array in accordance with the present subject matter. As shown, there are three ground electrodes 1110, 1120, 1130 that sandwich capacitor electrodes 1140 and 1150. Each of the ground electrodes 1110, 1120, 1130 have associated therewith a connection tab 1112, 1122, 1132 respectively that, in the final assembly will protrude from housing material, not shown, that may be optionally composed of varistor or dielectric material as in previously illustrated embodiments.

In the embodiment illustrated in FIGS. 11a and 11b, a resistor element 1160, may be secured to electrode tabs 1144, 1154 protruding from a side portion of the unshown housing.

Figure 12A:
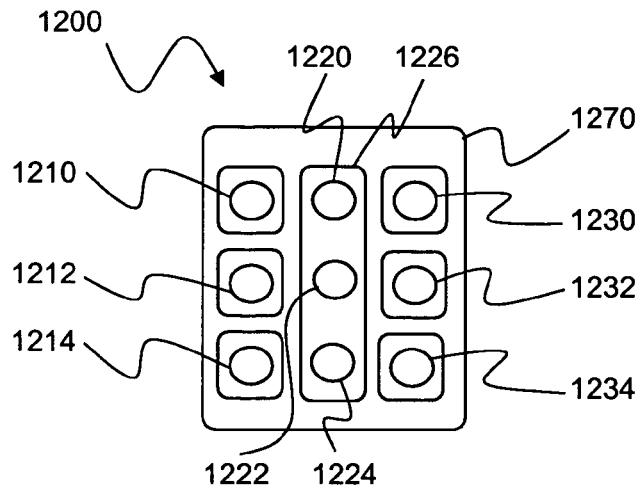
FIGS. 12a and 12b are, respectively top and side elevations of a device constructed using the electrode layout illustrated in FIGS. 11a and 11b.
Figure 12B:
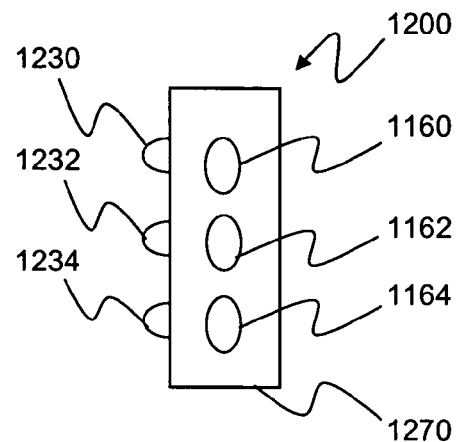

FIGS. 12a and 12b illustrate a completed multilayer vertically integrated array 1200 in accordance with the present subject matter. Array 1200 corresponds to a housing 1170 encased structure containing three sets of electrodes as illustrated in FIG. 11b so as to provide three independent capacitors. FIG. 12a is a top view of the assembled multilayer vertically integrated array. Solder bump 1210, 1212, 1214 each connect corresponding capacitor terminals equivalent to electrode terminal 1142 (FIGS. 11a and 11b). In like manner, solder bumps 1220, 1222, 1224 each connect corresponding groups of ground electrodes 1112, 1122, 1132 which, in turn are coupled together via conductive trace 1226. Solder bumps 1230, 1232, 1234 each connect corresponding capacitor terminals equivalent to electrode terminal 1152 (FIGS. 11a and 11b).

Turning now more specifically to FIG. 12b, there is illustrated a side view of the assembled multilayer vertically integrated array 1200. Particular attention is directed to resistive elements 1160, 1162, 1164 that are secured to the side of encasing housing 1270. Resistive element 1160 corresponds directly to the similarly numbered resistive element illustrated in FIG. 11a while resistive elements 1162, 1164 correspond to equivalent resistive elements provide for the second and third duplicative arrays housed within the same housing 1270 as the first array with which resistive element 1160 is associated. As with previous embodiments disclosed herein, encasing housing may be optionally composed of varistor or dielectric material.

Figure 13A:
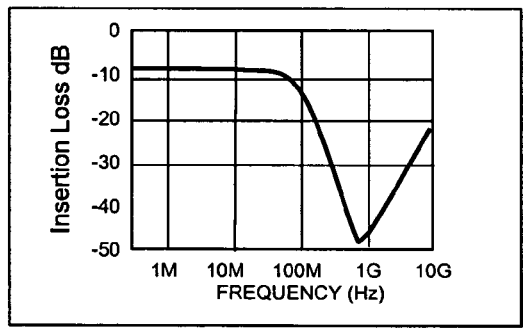
FIGS. 13a and 13b illustrate operational characteristics for the device illustrated in FIGS. 12a and 12b.
Figure 13B:
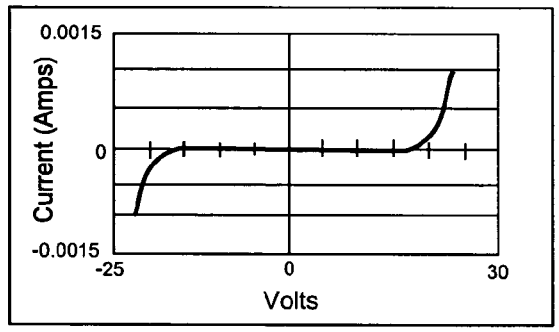

FIGS. 13a and 13b illustrate operational characteristics for the device illustrated in FIGS. 12a and 12b. FIG. 13a depicts exemplary insertion loss characteristics for the device illustrated in FIGS. 12a and 12b with respect to frequency while FIG. 13b illustrates the current to voltage relationship for an exemplary device when using a varistor material.

Figure 14:
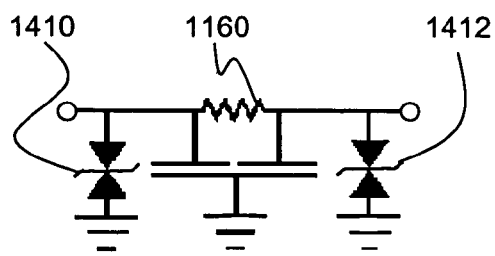
FIG. 14 is and exemplary equivalent circuit of the device illustrated in FIGS. 12a and 12b.

FIG. 14 is and exemplary equivalent circuit of the device illustrated in FIGS. 12a and 12b. Resistive element 1160 corresponds to similarly numbered resistive elements illustrated in FIGS. 12a and 12b. Equivalently illustrated varistors 1410, 1412 are produced when the housing material is optionally provided as varistor material.

FIGS. 15a, 16a and 15b, 16b respectively illustrate additional exemplary embodiments of multilayer vertically integrated arrays 1500, 1600 in accordance with the present subject matter. These embodiments are similar to that illustrated in FIGS. 12a, 12b in that there is provided external resistive elements 1560, 1562, 1660, 1662 arranged in these embodiments to be secured to a bottom surface of the unshown housings associated with each of the illustrated multilayer vertically integrated arrays in accordance with the present subject matter.

In a manner similar to the embodiment illustrated in FIGS. 11a, 11b, the exemplary embodiment of FIGS. 15a, 15b is configured to provide external resistive elements 1560, 1562 secured to the bottom surface of an unshown housing that, as previously noted may optionally be composed of varistor or dielectric material. Unlike the previous embodiments, however, the exemplary embodiment illustrated in FIGS. 15a, 15b provides for the construction of a dual pi-filter configuration by providing paired electrode and resistive components.

As more easily seen in FIG. 15b, ground electrodes 1510, 1520, 1530, 1540 are configured to sandwich separate electrode structures 1570, 1580, and 1590, 1596. Electrodes 1570 and 1580 are provided with tabs 1572, 1582, respectively that are configured to protrude through a bottom surface of an unshown housing on which resistive elements 1560 and 1562 are secured. Resistive element 1560 is configured to be coupled between tabs 1572 and 1582 while resistive element 1562 is configured to be couple between tabs 1592 and 1598 of electrodes 1590 and 1596, respectively.

With reference now to FIGS. 16a, 16b, there is illustrated yet another exemplary embodiment of a multilayer vertically integrated array in accordance with the present subject matter. The exemplary embodiment illustrated in FIGS. 16a, 16b is somewhat similar to that illustrated in FIGS. 15a, 15b and, thus will not be described in as completed a detail as that already described with respect to FIG. 15a, 15b. As is evident from an inspection of the exemplary embodiment of FIGS. 16a, 16b, the multilayer vertically integrated array here illustrated includes five ground electrodes 1610, 1620, 1630, 1640, 1650, each having associated there with a tab 1612, 1622, 1632, 1642, 1653 protruding from a top surface of an unshown housing having the same characteristics as previously discussed housings.

In a similar manner as with the embodiment illustrated in FIGS. 15a, 15b, external resistive elements 1660, 1662 are secured to the bottom surface of the unshown housing and configured to be coupled to selected tabs associated with additional unnumbered illustrated capacitive electrodes.

FIGS. 17a and 17b illustrate yet another exemplary embodiment of the present technology wherein resistor elements 1760, 1762 are provided as layers internal to the multilayer vertically integrated array in accordance with the present subject matter. The placement of the resistive elements 1760, 1762 within the structure of the multilayer vertically integrated array provides certain aspects to the physical construction of the device that may provide advantages. One advantage would correspond to construction cost would be less as the resistive element can be printed inside the multilayer vertically integrated array prior to firing, when it can be done on multiple parts. An additional advantage would result from an expected improvement in reliability as the resistive element would be completely encased in the unshown housing material.

As illustrated in FIGS. 17a and 17b, an exemplary multilayer vertically integrated array in accordance with the present subject matter including internally printed resistive elements 1760, 1762 corresponds in an exemplary configuration to a plurality of ground electrodes 1710, 1720, 1730, 1740, 1750, sandwiching there between capacitive electrodes 1770, 1772, 1780, 1782. Ground electrodes 1710, 1720, 1730, 1740, 1750, each have associated therewith a connection tab 1712, 1722, 1732, 1742, 1752, respectively that may, in a fully constructed form, be coupled together in a manner similar to that illustrated with respect to conductive trace 1226 illustrated in FIG. 12a.

Capacitive electrodes 1770, 1772, 1780, 1782 each have tabs representatively illustrated by tabs 1774, 1776 associated with electrode 1770 and 1782, 1784 associated with electrode 1780 that extend to the outer surface of an unshown housing that may be used to couple the fully assembled multilayer vertically integrated array to a circuit board or other electrical connection assembly. Additionally, resistive elements 1760, 1762 include tab portions representatively illustrated at 1764, 1766 that extend to the surface of the unshown housing and may be coupled to selected electrode tabs associated with the other electrodes within the multilayer vertically integrated array to provide selected equivalent circuitry as exemplarily illustrated in FIG. 14.

Figure 18:
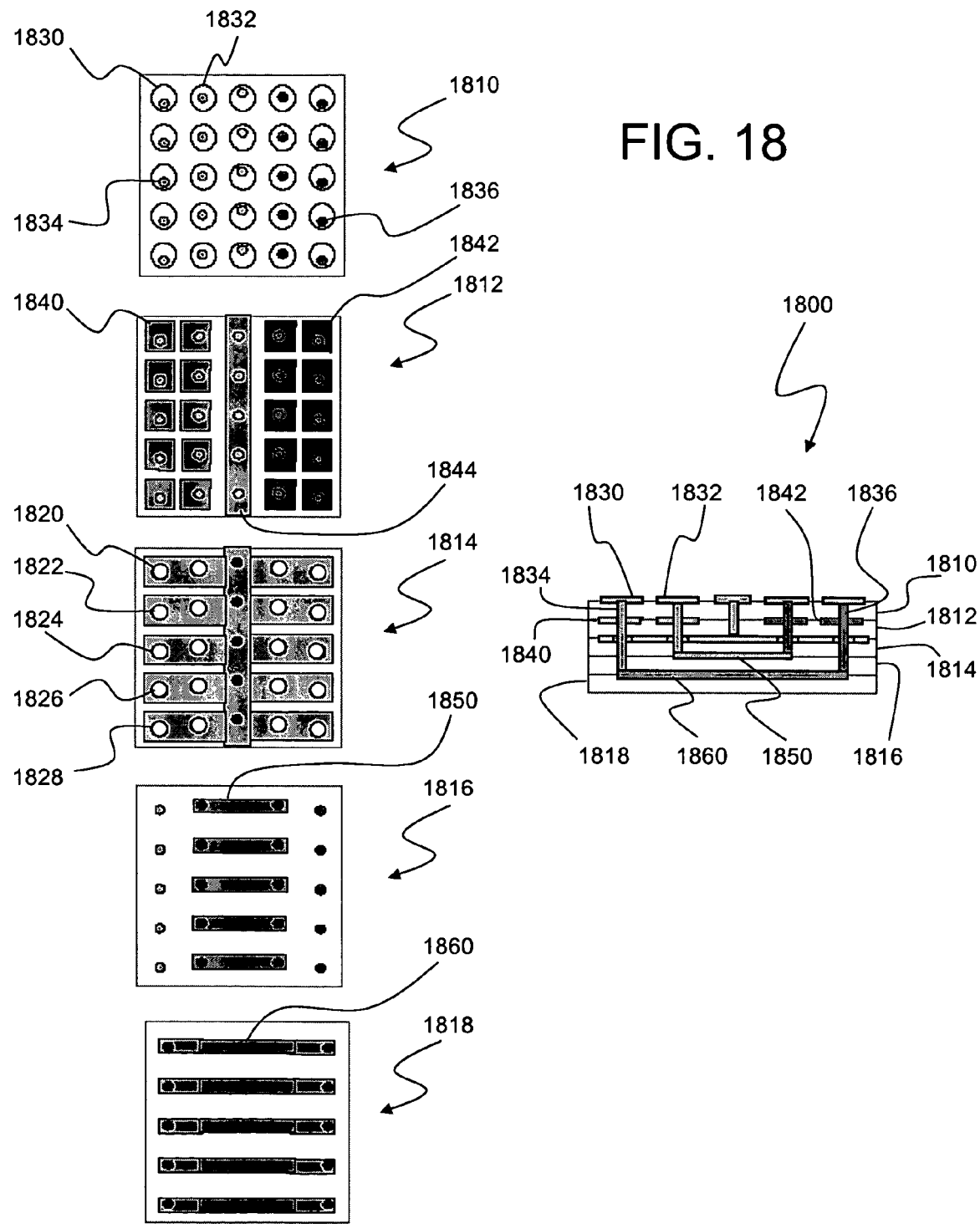
FIG. 18 illustrates an alternative layered construction methodology employing window vias and internally provided resistive elements.

FIG. 18 illustrates (in exploded and composite views) an exemplary multilayered capacitor array 1800 constructed in accordance with a layered methodology in accordance with a yet further embodiment of the present technology. As illustrated in FIG. 18, a multilayer capacitor array 1800 is provided by stacking a plurality of layers 1810, 1812, 1814,

1816, 1818 one on top of the other and by providing appropriately placed windows (having insulating areas, as understood by those of ordinary skill in the art, to permit conductive vias), representatively illustrated at 1820, 1822, 1824, 1826, and 1828 in a ground plane layer 1814 of the multilayer capacitor.

Top layer 1810 illustrates a plurality of via connections points representatively illustrated at 1834 and 1836 beneath ball limiting metallurgy (BLM) representatively illustrated at 1830 and 1832. As may be seen in the exemplary configuration of FIG. 18, a five by five matrix configuration may be provided. It should be strictly understood that such array dimensions are exemplary only and that other configurations may be provided in accordance with the present technology.

The second layer of the exemplary multilayer capacitor 1800 corresponds to a layer of electrode plates representatively illustrated by electrodes 1840 and 1842. A central conductive trace 1844 may be used to assist in coupling the ground plane elements supported on the third layer, the ground plane layer 1814.

The forth and fifth layers, layers 1814 and 1818 respectively, provide support for resistive elements representatively illustrated at 1850 on layer 1816 and 1860 on layer 1818. Each of the components including the capacitive electrodes on layer 1812, the ground plane layer conductive electrodes on layer 1814 and selected resistive elements on layers 1814 and 1816 may be coupled together by way of conductive vias representatively show at 1834 and 1836 as previously discussed.

Selected of the capacitor electrodes representatively illustrated at 1840 and 1842 may have windows created therein so that a conductive via may be created through the selected electrode such that an electrical connection may be made with elements or layers on either side of the windowed element while avoiding connection to the windowed element. In this manner various pi-filter connections may be created.

While the present subject matter has been described in detail with respect to specific embodiments thereof, it will be appreciated that those skilled in the art, upon attaining an understanding of the foregoing may readily conceive of alterations to, variations of, and equivalents to such embodiments. For example, the embodiment illustrated in FIGS. 6*a*, 6*b*, and 6*c* might be modified to include an additional tab associated with electrode 614 configured to mirror the existing tab 624 so that such additional tab might be exposed on the top surface of the multilayer vertically integrated array along with tabs 621 and 623 as shown in FIG. 6*c*. In addition such a modification might also provide for the inclusion of an additional termination land associated with such additional tab to provide for yet additional connection possibilities to yet additional external components. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A multilayer vertically integrated array, comprising:
    a plurality of electrode layers arranged in substantially parallel positions;
    a plurality of electrode tabs respectively associated with said electrode layers and extending from alternating electrode layers so as to be aligned in respective columns, said plurality of electrode tabs respectively having a plurality of end portions;
    encasing material completely surrounding said electrode layers but with said end portions of said tabs remaining exposed at the surface of said encasing material;
    at least one termination land for electrically connecting with selected at least one of said exposed end portions of said tabs; and
    wherein at least some of said plurality of electrode layers respectively comprise first shaped electrodes and second shaped electrodes having a different shape from said first shaped electrodes, for relative increased inductance and resistance within said array, with at least one of said electrode layers comprising a common electrode situated centrally between said first shaped and second shaped electrodes.

2. A multilayer vertically integrated array as in claim 1, further comprising:
    a plurality of said termination lands for electrically connecting with respective selected groups of said exposed end portions of said tabs; and
    wherein said encasing material comprises dielectric material so that said array comprises a multilayer capacitor.

3. A multilayer vertically integrated array as in claim 1, further comprising:
    a plurality of said termination lands for electrically connecting with respective selected groups of said exposed end portions of said tabs; and
    wherein said encasing material comprises varistor material so that said array comprises a multilayer capacitor with transient overvoltage suppression capabilities.

4. A multilayer vertically integrated array as in claim 1, further comprising:
    at least four of said electrode layers; and
    a plurality of said termination lands for electrically connecting with respective selected groups of said exposed end portions of said tabs; and wherein
    said encasing material comprises dielectric material so that said array comprises at least one multilayer capacitor; and
    the size and number of said electrode layers and the interconnections thereamong effected with said terminations lands are selected so as to determine capacitance values of said array.

5. A multilayer vertically integrated array as in claim 1, wherein said exposed end portions of said tabs are all on one side of said array.

6. A multilayer vertically integrated array as in claim 1, wherein:
    said electrode layers and said tabs are respectively in an interdigitated configuration and configured for forming at least one capacitor; and
    said exposed end portions of said tabs are on at least two sides of said array, which two sides are generally opposite one another, whereby the equivalent series inductance of said array is generally lowered.

7. A multilayer vertically integrated array as in claim 1, wherein said array includes:
    at least three layers of electrodes, with said first shaped electrodes comprising S-shaped electrodes, and with said second shaped electrodes comprising I-shaped electrodes; and
    a plurality of termination lands for electrically connecting with respective exposed end portions of said tabs associated with said common electrode and associated with said S-shaped and I-shaped electrodes.

8. A multilayer vertically integrated array as in claim 1, wherein said encasing material comprises varistor material so that said array comprises a multilayer capacitor with transient overvoltage suppression capabilities.

9. A multilayer vertically integrated array as in claim 1, wherein said encasing material comprises a material of varying electrical characteristics including at least one of dielectric and varistor material.

10. A multilayer vertically integrated array as in claim 1, further comprising:
    at least three of said electrode layers, with said plurality of electrode tabs respectively associated therewith extending from at least two opposite sides of said electrode layers so that respective of said plurality of end portions of said tabs are exposed on respective at least two opposite sides of said array, and with said first shaped electrodes comprising S-shaped electrodes, and with said second shaped electrodes comprising I-shaped electrodes; and
    a plurality of termination lands for electrically connecting with respective exposed end portions of said tabs associated with said common electrode and associated with said S-shaped and I-shaped electrodes; and wherein
    the size and number of said electrode layers and the interconnections thereamong effected with said terminations lands are selected so as to determine equivalent inductance, resistance and capacitance of said array.

11. A multilayer vertically integrated array as in claim 1, wherein:
    said first shaped electrodes are respectively not symmetrical in shape with said second shaped electrodes;
    electrode configurations of said array are substantially not symmetrical from layer to layer; and
    said exposed end portions of said tabs are on respective at least two opposite sides of said array.

12. A multilayer vertically integrated array as in claim 1, wherein:
    at least some of said plurality of electrode layers respectively comprise predetermined shaped electrodes, with at least one of said electrode layers comprising a common electrode situated centrally between said predetermined shaped electrodes;
    said predetermined shaped electrodes include tabs which are respectively situated on respective adjacent sides of said predetermined shaped electrodes; and
    said exposed end portions of said tabs are on respective at least top and side portions of said array.

13. A multilayer vertically integrated array, comprising:
    a plurality of electrode layers arranged in substantially parallel positions;
    a plurality of electrode tabs respectively associated with said electrode layers and extending from alternating electrode layers so as to be aligned in respective columns, said plurality of electrode tabs respectively having a plurality of end portions;
    encasing material completely surrounding said electrode layers but with said end portions of said tabs remaining exposed at the surface of said encasing material; and
    at least one termination land for electrically connecting with selected at least one of said exposed end portions of said tabs;
    wherein at least some of said plurality of electrode layers respectively comprise a plurality of U-shaped electrodes for relative increased inductance and resistance within said array, with at least one of said electrode layers comprising a common electrode situated centrally between pluralities of said U-shaped electrodes;
    said plurality of U-shaped electrodes are respectively identical in shape;
    electrode configurations of said array are substantially symmetrical from layer to layer; and
    said exposed end portions of said tabs are all on one side of said array.

14. A multilayer vertically integrated array as in claim 13, wherein said array includes:
    at least three layers of electrodes, with at least two of such layers comprising said pluralities of U-shaped electrodes, and with at least one of such layers comprising said common electrode situated therebetween;
    at least one termination land for electrically connecting with an exposed end portion of a tab associated with said common electrode; and
    a plurality of termination lands for electrically connecting with respective pairs of exposed end portions of said tabs associated with respective pairs of said U-shaped electrodes.

15. A multilayer vertically integrated array as in claim 13, wherein said encasing material comprises varistor material so that said array comprises a multilayer capacitor with transient overvoltage suppression capabilities.

16. A multilayer vertically integrated array as in claim 13, wherein said encasing material comprises a material of varying electrical characteristics including at least one of dielectric and varistor material.

17. A multilayer vertically integrated array as in claim 13, further comprising:
    at least three of said electrode layers; and
    a plurality of said termination lands for electrically connecting with respective selected groups of said exposed end portions of said tabs; and wherein
    the size and number of said electrode layers and the interconnections thereamong effected with said terminations lands are selected so as to determine equivalent inductance, resistance and capacitance of said array.

18. A multilayer vertically integrated array, comprising:
    a plurality of electrode layers arranged in substantially parallel positions;
    a plurality of electrode tabs respectively associated with said electrode layers and extending from alternating electrode layers so as to be aligned in respective columns, said plurality of electrode tabs respectively having a plurality of end portions;
    encasing material completely surrounding said electrode layers but with said end portions of said tabs remaining exposed at the surface of said encasing material; and
    at least one termination land for electrically connecting with selected at least one of said exposed end portions of said tabs;
    wherein at least some of said plurality of electrode layers respectively comprise a plurality of L-shaped electrodes for relative increased inductance and resistance within said array, with at least one of said electrode layers comprising a common electrode situated centrally between pluralities of said L-shaped electrodes;
    said plurality of L-shaped electrodes are respectively identical in shape;
    electrode configurations of said array are substantially symmetrical from layer to layer; and
    said exposed end portions of said tabs are all on one side of said array.

19. A multilayer vertically integrated array as in claim 18, wherein said array includes:
    at least three layers of electrodes, with at least two of such layers comprising said pluralities of L-shaped electrodes, and with at least one of such layers comprising said common electrode situated therebetween;

at least one termination land for electrically connecting with an exposed end portion of a tab associated with said common electrode; and a plurality of termination lands for electrically connecting with respective pairs of exposed end portions of said tabs associated with respective pairs of said L-shaped electrodes.

20. A multilayer vertically integrated array as in claim 18, wherein said encasing material comprises varistor material so that said array comprises a multilayer capacitor with transient overvoltage suppression capabilities.

21. A multilayer vertically integrated array as in claim 18, wherein said encasing material comprises a material of varying electrical characteristics including at least one of dielectric and varistor material.

22. A multilayer vertically integrated array as in claim 18, further comprising:

at least three of said electrode layers; and a plurality of said termination lands for electrically connecting with respective selected groups of said exposed end portions of said tabs; and wherein the size and number of said electrode layers and the interconnections thereamong effected with said terminations lands are selected so as to determine equivalent inductance, resistance and capacitance of said array.

23. A multilayer vertically integrated array, comprising:

a plurality of electrode layers arranged in substantially parallel positions;

a plurality of electrode tabs respectively associated with said electrode layers and extending from alternating electrode layers so as to be aligned in respective columns, said plurality of electrode tabs respectively having a plurality of end portions;

encasing material completely surrounding said electrode layers but with said end portions of said tabs remaining exposed at the surface of said encasing material; and at least one termination land for electrically connecting with selected at least one of said exposed end portions of said tabs;

wherein said array includes a plurality of predetermined shaped electrodes respectively comprising said plurality of electrode layers;

a plurality of termination lands for electrically connecting with respective exposed end portions of said tabs associated with respective of said predetermined shared electrodes; and a plurality of external components comprised of at least one of additional inductance, resistance and capacitance, and respectively associated with selected of said termination lands so as to form with said array a filter, wherein the size and number of said electrode layers and the interconnections thereamong and with said external components effected with said terminations lands are selected so as to determine equivalent inductance, resistance and capacitance of said array, and so as to determine resulting filter characteristics of said filter formed therewith; and wherein said plurality of termination lands are selectively configured so as to form two physically parallel groupings of electrodes; and said external components include at least two resistors, so that said filter is configured as a Pi-filter.

24. A multilayer vertically integrated array as in claim 23, wherein said encasing material comprises varistor material so that said array includes a multilayer capacitor with transient overvoltage suppression capabilities.

25. A multilayer vertically integrated array as in claim 23, wherein said encasing material comprises a material of varying electrical characteristics including at least one of dielectric and varistor material.

26. A multilayer vertically integrated array, comprising:

a plurality of electrode layers arranged in substantially parallel positions;

a plurality of electrode tabs respectively associated with said electrode layers and extending from alternating electrode layers so as to be aligned in respective columns, said plurality of electrode tabs respectively having a plurality of end portions;

encasing material completely surrounding said electrode layers but with said end portions of said tabs remaining exposed at the surface of said encasing material; and at least one termination land for electrically connecting with selected at least one of said exposed end portions of said tabs;

wherein at least some of said plurality of electrode layers respectively comprise serpentine-shaped electrodes for relative increased inductance and resistance within said array, with at least one of said electrode layers comprising a common electrode situated centrally between said serpentine-shaped electrodes;

said plurality of serpentine-shaped electrodes are respectively symmetrical in shape;

electrode configurations of said array are substantially symmetrical from layer to layer; and said exposed end portions of said tabs are all on one side of said array.

27. A multilayer vertically integrated array as in claim 26, wherein said array includes:

at least three layers of electrodes, with at least two of such layers comprising said serpentine-shaped electrodes, and with at least one of such layers comprising said common electrode situated therebetween; and a plurality of termination lands for electrically connecting with respective exposed end portions of said tabs associated with said common electrode and associated with said serpentine-shaped electrodes.

28. A multilayer vertically integrated array as in claim 26, wherein said encasing material comprises varistor material so that said array comprises a multilayer capacitor with transient overvoltage suppression capabilities.

29. A multilayer vertically integrated array as in claim 26, wherein said encasing material comprises a material of varying electrical characteristics including at least one of dielectric and varistor material.

30. A multilayer vertically integrated array as in claim 26, further comprising:

at least three of said electrode layers; and a plurality of said termination lands for electrically connecting with respective exposed end portions of said tabs associated with said common electrode and associated with said serpentine-shaped electrodes; and wherein the size and number of said electrode layers and the interconnections thereamong effected with said terminations lands are selected so as to determine equivalent inductance, resistance and capacitance of said array.

31. A multilayer vertically integrated array, comprising:

a plurality of electrode layers arranged in substantially parallel positions;

a plurality of electrode tabs respectively associated with said electrode layers and extending from alternating electrode layers so as to be aligned in respective columns, said plurality of electrode tabs respectively having a plurality of end portions;

encasing material completely surrounding said electrode layers but with said end portions of said tabs remaining exposed at the surface of said encasing material; and at least one termination land for electrically connecting with selected at least one of said exposed end portions of said tabs;

wherein said array includes a plurality of predetermined shaped electrodes respectively comprising said plurality of electrode layers;

a plurality of termination lands for electrically connecting with respective exposed end portions of said tabs associated with respective of said predetermined shaped electrodes; and a plurality of external components comprised of at least one of additional inductance, resistance and capacitance, and respectively associated with selected of said termination lands so as to form with said array a filter, wherein the size and number of said electrode layers and the interconnections thereamong and with said external components effected with said terminations lands are selected so as to determine equivalent inductance, resistance and capacitance of said array, and so as to determine resulting filter characteristics of said filter formed therewith; and wherein said plurality of termination lands are selectively configured so as to form two physically parallel groupings of electrodes comprising a respective first group and second group of said electrodes, separated from one another by a gap, and with the electrode sequences of said first group of said electrodes reversed from that of the electrode sequences of said second group of said electrodes; and some of said termination lands are selectively coupled across said gap with the nearest electrodes of said first group and second group of said electrodes across said gap from one another, whereby such electrode and termination land placements significantly reduce formation of any parasitic capacitance within said filter formed with said array.

32. A multilayer vertically integrated array, comprising:

a plurality of electrode layers arranged in substantially parallel positions;

a plurality of electrode tabs respectively associated with said electrode layers and extending from alternating electrode layers so as to be aligned in respective columns, said plurality of electrode tabs respectively having a plurality of end portions;

encasing material completely surrounding said electrode layers but with said end portions of said tabs remaining exposed at the surface of said encasing material;

at least one termination land for electrically connecting with selected at least one of said exposed end portions of said tabs;

at least five of said electrode layers, with at least two of said plurality of electrode layers respectively comprising predetermined shaped capacitor electrodes, and with other of said electrode layers comprising common ground electrodes respectively sandwiching said predetermined shaped capacitor electrodes;

said predetermined shaped capacitor electrodes including tabs which are respectively situated on respective adjacent sides of said predetermined shaped capacitor electrodes, so that said exposed end portions of said tabs of said predetermined shaped capacitor electrodes are on respective at least top and side portions of said array;

a plurality of termination lands for electrically connecting with respective exposed end portions of said tabs associated with said common ground electrodes and associated with said predetermined shaped capacitor electrodes; and at least one external component comprised of at least one of additional inductance, resistance and capacitance, and respectively associated with selected of said termination lands.

33. A multilayer vertically integrated array as in claim 32, wherein said at least one external component comprises a resistor, respectively associated with selected of said termination lands associated with said predetermined shaped capacitor electrodes so as to form with said array a filter, wherein the size and number of said electrode layers and the interconnections thereamong and with said at least one external component effected with said terminations lands are selected so as to determine equivalent inductance, resistance and capacitance of said array, and so as to determine resulting filter characteristics of said filter formed therewith.

34. A multilayer vertically integrated array as in claim 32, wherein said encasing material comprises varistor material so that said array comprises a multilayer capacitor with transient overvoltage suppression capabilities.

35. A multilayer vertically integrated array as in claim 32, wherein said encasing material comprises a material of varying electrical characteristics including at least one of dielectric and varistor material.

36. A multilayer vertically integrated array, comprising:

a plurality of electrode layers arranged in substantially parallel positions;

a plurality of electrode tabs respectively associated with said electrode layers and extending from alternating electrode layers so as to be aligned in respective columns, said plurality of electrode tabs respectively having a plurality of end portions;

encasing material completely surrounding said electrode avers but with said end portions of said tabs remaining exposed at the surface of said encasing material;

at least one termination land for electrically connecting with selected at least one of said exposed end portions of said tabs;

at least three respective sets of electrodes formed by said plurality of electrode layers and respectively providing at least three independent respective capacitors, with at least two of said plurality of electrode layers for each set of electrodes respectively comprising predetermined shaped capacitor electrodes, and with other of said electrode layers of said each respective set of electrodes comprising common ground electrodes respectively sandwiching said predetermined shaped capacitor electrodes;

said predetermined shaped capacitor electrodes including tabs which are respectively situated on respective adjacent sides of said predetermined shaped capacitor electrodes, so that said exposed end portions of said tabs of said predetermined shaped capacitor electrodes are on respective at least top and side portions of said array;

a plurality of termination lands comprising solder bumps and conductive traces for electrically connecting with respective exposed end portions of said tabs associated with said common ground electrodes and associated with said predetermined shaped capacitor electrodes; and at least one external component for each of said sets of electrodes comprised of at least one of additional inductance, resistance and capacitance, and respectively associated with selected of said termination lands.

37. A multilayer vertically integrated array as in claim 36, wherein said at least one external component comprises a resistor, respectively associated with selected of said termination lands associated with said predetermined shaped capacitor electrodes so as to form with said array a filter, wherein the size and number of said electrode layers and the interconnections thereamong and with said at least one external component effected with said terminations lands are selected so as to determine equivalent inductance, resistance and capacitance of said array, and so as to determine resulting filter characteristics of said filter formed therewith.

38. A multilayer vertically integrated array as in claim 36, wherein said encasing material comprises varistor material so that said array comprises a multilayer capacitor with transient overvoltage suppression capabilities.

39. A multilayer vertically integrated array as in claim 36, wherein said encasing material comprises a material of varying electrical characteristics including at least one of dielectric and varistor material.

40. A multilayer vertically integrated array, comprising:
   a plurality of electrode layers arranged in substantially parallel positions;
   a plurality of electrode tabs respectively associated with said electrode layers and extending from alternating electrode layers so as to be aligned in respective columns, said plurality of electrode tabs respectively having a plurality of end portions;
   encasing material completely surrounding said electrode layers but with said end portions of said tabs remaining exposed at the surface of said encasing material; and
   at least one termination land for electrically connecting with selected at least one of said exposed end portions of said tabs;
   wherein at least some of said plurality of electrode layers respectively comprise a plurality of predetermined shaped electrodes, with at least one of said electrode layers comprising a common electrode situated centrally between pluralities of said predetermined shaped electrodes;
   at least some of said plurality of predetermined shaped electrodes comprise layered resistor elements;
   and wherein said array further includes a plurality of said termination lands for electrically connecting with selected of said exposed end portions of said tabs; and
   wherein the size and number of said electrode layers and the interconnections thereamong effected with said terminations lands are selected so as to determine equivalent inductance, resistance and capacitance of said array.

41. A multilayer vertically integrated capacitor array compatible with a land grid array packaging configuration, comprising,
   a stacked plurality of layers arranged in substantially parallel positions;
   a ground plane layer centrally formed in said stacked plurality of layers, said ground plane layer forming a plurality of window vias therein;
   a plurality of via connection points formed respectively in the other of said plurality of layers, said via connection points formed in respective columns so as to be aligned with said window vias of said ground plane layer;
   ball limiting metallurgy formed at said via connection points of one of said other layers situated towards an exterior surface of said array;
   encasing material completely surrounding said layers but with said ball limiting metallurgy remaining exposed at said exterior surface of said array;
   a plurality of capacitor electrodes supported on one of said other layers;
   a central conductive trace supported on said one of said other layers for electrical coupling with said ground plane layer; and
   a plurality of resistive elements supported on other of said other layers, so that said capacitor elements, said ground plane layer, and selected of said resistive elements may be coupled together by way of conductive vias.

42. A multilayer vertically integrated capacitor array compatible with a land grid array packaging configuration, as in claim 41, wherein selected of said capacitor electrodes have windows formed therein so that a conductive via may be created through the selected capacitor electrode such that an electrical connection may be made with elements or layers on either side of the windowed element while avoiding connection to the windowed element.

43. A multilayer vertically integrated capacitor array compatible with a land grid array packaging configuration, as in claim 41, wherein said array comprises a five by five matrix configuration of five layers, with a first layer thereof comprising said one of said other layers situated towards an exterior surface of said array, with a second layer thereof comprising said one of said other layers on which said plurality of capacitor electrodes and said central conductive trace are supported, with a third layer thereof comprising said central ground plane layer, and with fourth and fifth layers thereof comprising said other of said other layers on which said plurality of resistive elements are supported.

* * * * *

UNITED STATES PATENT AND TRADEMARK OFFICE
CERTIFICATE OF CORRECTION

| | | |
|---|---|---|
| PATENT NO. | : 7,724,496 B2 | Page 1 of 1 |
| APPLICATION NO. | : 11/590681 | |
| DATED | : May 25, 2010 | |
| INVENTOR(S) | : Carl L. Eggerding et al. | |

It is certified that error appears in the above-identified patent and that said Letters Patent is hereby corrected as shown below:

In Column 22, line 36, please replace "avers" with the word --layers--.

Signed and Sealed this

Fifth Day of October, 2010

David J. Kappos
*Director of the United States Patent and Trademark Office*